(12) United States Patent
Tanaka et al.

(10) Patent No.: US 6,334,835 B1
(45) Date of Patent: Jan. 1, 2002

(54) FUEL-CUT CONTROL DEVICE AND FUEL-CUT CONTROL METHOD

(75) Inventors: Hiroya Tanaka, Aichi-ken; Isao Takagi, Okazaki; Daisuke Inoue, Toyota, all of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/515,094

(22) Filed: Feb. 29, 2000

(30) Foreign Application Priority Data

| Mar. 3, 1999 | (JP) | 11-055107 |
| Mar. 4, 1999 | (JP) | 11-057572 |
| Mar. 25, 1999 | (JP) | 11-081450 |

(51) Int. Cl.$^7$ ............................................ F02D 9/06
(52) U.S. Cl. ...................................... 477/205; 477/187
(58) Field of Search ......................... 477/187, 203, 477/205

(56) References Cited

U.S. PATENT DOCUMENTS

| 5,199,399 A | * | 4/1993 | Shibuya | 477/111 |
| 5,520,594 A | * | 5/1996 | Fukasawa et al. | 477/173 |
| 5,626,536 A | * | 5/1997 | Kono et al. | 477/181 |
| 5,733,223 A | * | 3/1998 | Matsubara et al. | 477/175 |
| 5,807,209 A | * | 9/1998 | Matsubara et al. | 477/176 |
| 6,102,831 A | * | 8/2000 | Wakahara et al. | 477/169 |
| 6,190,284 B1 | * | 2/2001 | Kuroda et al. | 477/107 |
| 6,192,857 B1 | * | 2/2001 | Shimada | 123/322 |

FOREIGN PATENT DOCUMENTS

| JP | 62-51730 | 3/1987 |
| JP | 7-12807 | 2/1995 |

* cited by examiner

Primary Examiner—Charles A Marmor
Assistant Examiner—Ha Ho
(74) Attorney, Agent, or Firm—Oblon, Spivak, McClelland, Maier & Neustadt, P.C.

(57) ABSTRACT

Abrupt deceleration of a vehicle is detected based on a depression amount or a depression speed of a brake pedal. If abrupt deceleration of the vehicle has been detected during fuel-cut control, a command is issued to make forcible restoration of control out of the fuel-cut control. Then a lock-up clutch is disconnected and fuel injection for an engine is resumed so as to restore a rotational speed of the engine. As a result, the engine is prevented from stalling due to the undershooting of the engine rotational speed.

11 Claims, 20 Drawing Sheets

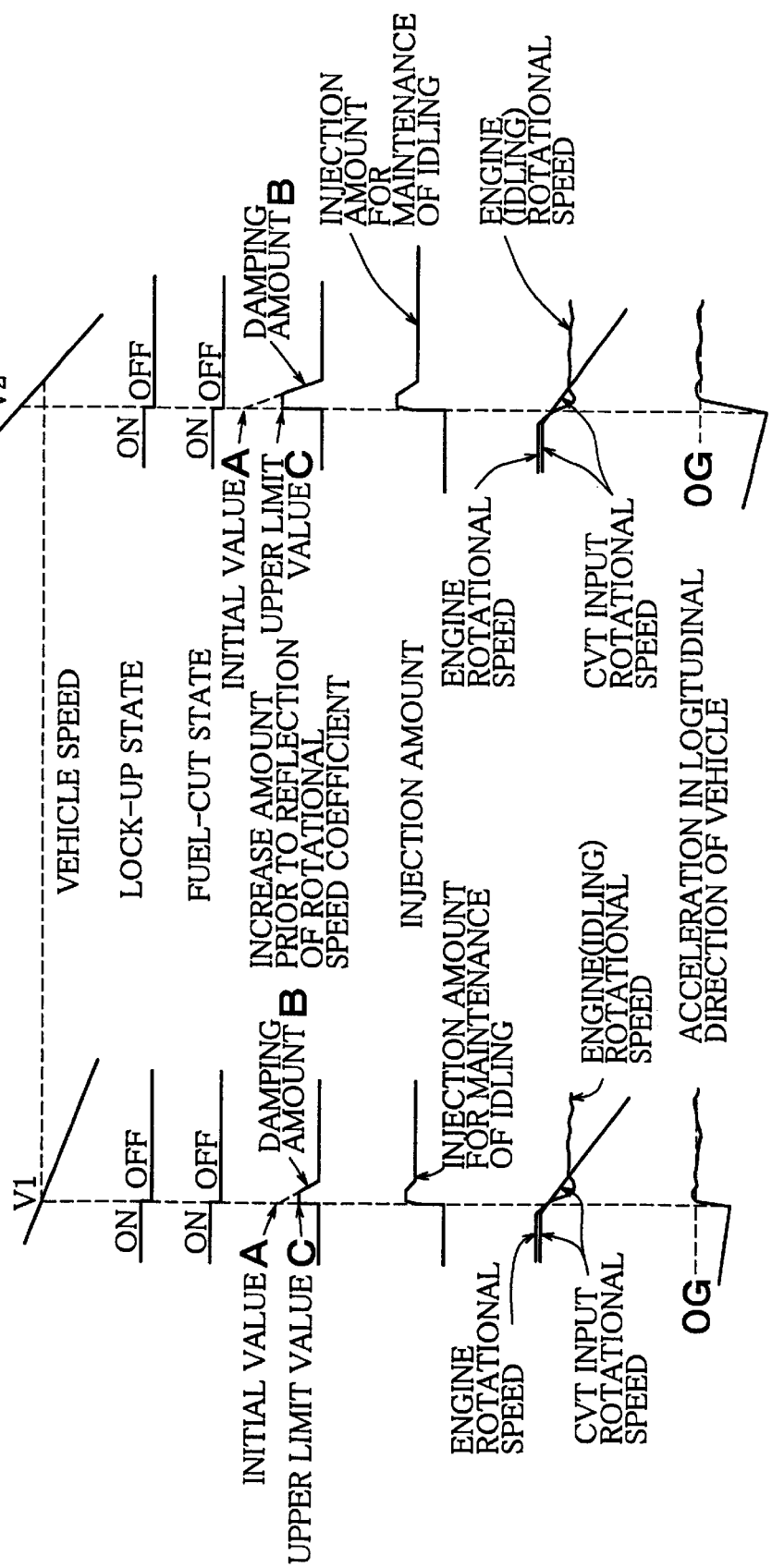

FUEL-CUT CONTROL DEVICE AND FUEL-CUT CONTROL METHOD

INCORPORATION BY REFERENCE

The disclosures of Japanese Patent Application Nos. HEI 11-55107 filed on Mar. 3, 1999, HEI 11-57572 filed on Mar. 4, 1999 and HEI 11-81450 filed on March 25 including the specification, drawings and abstract are incorporated herein by reference in their entirety.

BACKGROUND OF THE INVENTION

1. Field of the Invention

The present invention relates to a fuel-cut control device for fuel supplied to an engine and, more particularly, to a fuel-cut control device and a fuel-cut control method that prevent the engine from going into a stall due to undershooting of engine rotational speed at the time of abrupt deceleration of a vehicle during fuel-cut control.

2. Description of the Related Art

In general, some vehicles having an automatic transmission (including those having a continuously variable transmission) are equipped with a fuel-cut device for cutting off supply of fuel to an engine during deceleration, for example, until the engine rotational speed becomes lower than a predetermined fuel-cut lower limit rotational speed. In such vehicles, since no fuel is consumed during deceleration of the vehicle that does not require an output from the engine, fuel consumption of the vehicle is improved. The greater the fuel-cut range becomes, the greater the effect of improving fuel consumption becomes. Therefore, it is desired that the fuel-cut lower limit rotational speed be lowered.

Thus, for example, according to what is disclosed in Japanese Patent Publication No. HEI 7-12807, while a fuel-cut device cuts off the supply of fuel to an engine, the engine can be operated by engaging (connecting) a lock-up clutch for performing mechanical connection and disconnection between the engine and a drive wheel and by transmitting a driving force of the vehicle to the engine through the lock-up clutch. In this construction, while the fuel-cut device cuts off the supply of fuel to the engine, the lock-up clutch is engaged (including a slipping state based on half engagement) so that a rotational force based on the running of the vehicle is transmitted to the vehicle. Therefore, at the time of deceleration, the rotational speed of the engine gradually decreases in accordance with a vehicle speed. Thus, the fuel-cut range is enlarged. As a result, the fuel consumption of the vehicle is improved in comparison with the case where the lock-up clutch is released (disconnected) as soon as the vehicle starts to decelerate.

Further, if the rotational speed of the engine has become equal to or lower than the fuel-cut lower limit rotational speed, the lock-up clutch is disconnected (released) and the engine is set free from the drive wheel (connected to the drive wheel only through fluid in a torque converter). Then fuel injection for the engine is resumed and the engine is self driven, so that idling rotation of the engine is maintained.

When an accelerator pedal is depressed, the engine output is increased and the lock-up clutch is connected again, so that the output of the engine is transmitted to the drive wheels.

As described above, if the vehicle decelerates to a predetermined speed and fuel-cut operation is terminated, the engine is mechanically disconnected from the drive wheels by disconnecting the lock-up clutch, and fuel injection is resumed. In this case, as shown in a timing chart in FIG. 4, if an engine control device recognizes a timing for terminating the fuel-cut operation by making a calculation based on a vehicle speed, an engine load, an engine rotational speed and the like, the fuel-cut state is switched from ON to OFF (0) and the lock-up state is switched from ON to OFF (0). Then the lock-up clutch is disconnected and the engine is mechanically disconnected from the drive wheels (actually from a transmission such as a CVT—Continuously Variable Transmission—or the like). Furthermore, at this moment, based on the fact that the fuel-cut state has been switched from ON to OFF (0), fuel injection for the engine is resumed so as to operate the engine at a predetermined rotational speed (idling rotation).

As shown in the timing chart in FIG. 4, the fuel-cut device or the like requires a predetermined length of calculation time in order to make a calculation for recognizing a timing for terminating the fuel-cut operation (e.g., a calculation in which the vehicle speed V is used as a trigger). Therefore, there is a time lag from detection of the vehicle speed V to a change (from ON to OFF) in fuel-cut state or in lock-up state. As indicated by a broken line in FIG. 4, when the vehicle decelerates in a normal running state, the fuel-cut state or the lock-up state is turned OFF before the engine rotational speed becomes lower than a threshold value T despite the presence of the time lag, so that fuel injection is resumed. Hence, the engine rotational speed can be brought back to a predetermined rotational speed (e.g. an idling rotational speed) without becoming lower than the threshold value T (see the broken line in FIG. 4).

However, if the driver has abruptly depressed a brake pedal for some reason during the fuel-cut control, namely, if the vehicle has abruptly decelerated (see a solid line in FIG. 4), and the fuel-cut state or the lock-up state is not OFF in the course of a calculation in which the timing for terminating the fuel-cut operation is recognized using the vehicle speed V as a trigger, the lock-up clutch remains connected and the engine rotational speed abruptly decreases with a decrease in rotational speed of the drive wheel. As a result, even if the lock-up clutch has been disconnected or fuel injection has been resumed after the calculation, the engine rotational speed cannot be restored (see the solid line in FIG. 4), which causes a problem of engine stall. Especially in the case where the fuel-cut range is enlarged to improve fuel consumption (the rotational speed upon termination of the fuel-cut operation is lowered), the aforementioned problem of engine stall resulting from abrupt deceleration is acute.

SUMMARY OF THE INVENTION

The present invention has been made in consideration of the aforementioned problem. It is an object of the present invention to provide a fuel-cut control device that is capable of preventing an engine from going into a stall due to the undershooting of engine rotational speed when a vehicle abruptly decelerates during fuel-cut control.

In order to solve the aforementioned problem, a fuel-cut control device according to a first aspect of the present invention includes an engine, a torque converter having a lock-up clutch for performing operations of mechanical connection and disconnection of power between the engine and a drive wheel, a fuel-cut device for performing fuel-cut control wherein supply of fuel to the engine is suspended until the vehicle reaches a predetermined running state with the lock-up clutch being connected during deceleration of the vehicle, an abrupt deceleration detector for detecting abrupt deceleration of the vehicle, and a forcible restorer for suspending the fuel-cut control and making forcible restoration of control out of the fuel-cut control when the abrupt deceleration detector detects the abrupt deceleration.

It is to be noted herein that the predetermined running state of the vehicle means a certain state of the vehicle that can be determined, for example, based on a vehicle speed, an engine rotational speed and the like. In this construction, if abrupt deceleration of the vehicle has been detected, fuel-cut control is suspended immediately and forcible restoration of control out of the fuel-cut control is made. Therefore, even when the engine rotational speed abruptly decreases, it is possible to disconnect the lock-up clutch and resume fuel injection before the engine rotational speed becomes lower than a predetermined value. Thus, the engine rotational speed can be restored, and the engine can be prevented from going into a stall due to the undershooting of the engine rotational speed. The undershooting of the engine rotational speed means a phenomenon wherein the engine rotational speed drops way below a predetermined rotational speed. If the engine rotational speed becomes equal to or lower than the predetermined rotational speed, the engine is stopped.

The abrupt deceleration detector may be designed to detect abrupt deceleration of the vehicle based on at least one of an operational amount and an operational speed of a brake pedal of the vehicle.

According to this construction, abrupt deceleration of the vehicle can smoothly be recognized without making a complicated calculation. Therefore, forcible restoration of control out of the fuel-cut control can be made more swiftly.

The abrupt deceleration detector may be designed to detect abrupt deceleration of the vehicle based on an actuating signal of a brake assist system or an anti-lock brake system.

According to this construction, abrupt deceleration of the vehicle can smoothly be recognized making use of a result detected by an existing system. Therefore, forcible restoration of control out of the fuel-cut control can be made more swiftly. Also, since there is no need to add any component for detecting abrupt deceleration of the vehicle, engine stall at the time of abrupt deceleration can be prevented at a low cost.

Furthermore, the fuel-cut control device of the present invention may include an engine output controller for controlling an engine output by adjusting an amount of fuel supplied to the engine and may be designed such that when the vehicle reaches a predetermined running state and restoration of control out of fuel-cut operation by the fuel-cut device is made simultaneously with disconnection of the lock-up clutch, the engine output controller increases an engine output by a predetermined amount with respect to an idling maintenance output from a time of restoration of fuel injection and then restores the idling maintenance output.

According to this construction, when disconnecting the lock-up clutch, the torque can be increased because of an increase in engine output. Therefore, it is possible to reduce a torque discrepancy at the time of disconnection of the lock-up clutch, whereby it becomes possible to attenuate a shock delivered to the vehicle and to prevent the engine rotational speed from undershooting.

Further, the fuel-cut control device of the present invention may be designed as follows. That is, the engine output controller makes restoration of control out of the fuel-cut operation in a gradually increasing manner such that the engine output becomes greater than an idling maintenance output, a predetermined time prior to disconnection of the lock-up clutch after attainment of a predetermined running state by the vehicle, and restores the idling maintenance output after lapse of a predetermined time.

According to this construction, the control for increasing an engine output is gradually started prior to disconnection of the lock-up clutch. Therefore, the torque discrepancy is completely eliminated at the time of disconnection of the lock-up clutch, and the engine rotational speed changes smoothly. As a result, it is possible to attenuate a shock (at the time of restoration of control out of the fuel-cut operation) delivered to the vehicle and to inhibit engine stall securely and effectively.

Furthermore, the fuel-cut control device of the present invention may further include a delay detector for detecting a delay of disconnecting operation of the lock-up clutch when the vehicle reaches a predetermined running state and restoration of control out of the fuel-cut operation by the fuel-cut device is made simultaneously with disconnection of the lock-up clutch, and an output amplifier for increasing, based on a result detected by the delay detector, an engine output from an idling maintenance output.

According to this construction, if there is a delay in disconnection of the lock-up clutch, the engine output is increased from the idling maintenance output. Therefore, the engine torque increases and the engine rotational speed rises. As a result, it is possible to avoid engine stall.

According to a fuel-cut control method of the present invention, a delay of disconnecting operation of the lock-up clutch is detected when the vehicle reaches a predetermined running state and restoration of control out of the fuel-cut operation by the fuel-cut device is made simultaneously with disconnection of the lock-up clutch, and an engine output is increased from an idling maintenance output upon detection of a delay of disconnecting operation of the lock-up clutch.

According to the thus-constructed fuel-cut control method of the present invention, if abrupt deceleration of the vehicle has been detected, the fuel-cut control is suspended immediately and forcible restoration of control out of the fuel-cut control is made. Therefore, even when the engine rotational speed abruptly decreases, it is possible to disconnect the lock-up clutch and resume fuel injection before the engine rotational speed becomes lower than a predetermined value. Thus, the engine rotational speed can be restored, and the engine can be prevented from going into a stall.

BRIEF DESCRIPTION OF THE DRAWINGS

The foregoing and further objects, features and advantages of the present invention will become apparent from the following description of preferred embodiments with reference to the accompanying drawings, wherein:

FIG. 10A is a timing chart of fuel control when the decelerating force is small in the second embodiment;

FIG. 10B is a timing chart of fuel control when the decelerating force is great in the second embodiment;

DETAILED DESCRIPTION OF PREFERRED EMBODIMENTS

Preferred embodiments of the present invention will be described hereinafter with reference to the drawings.

Figure 1:
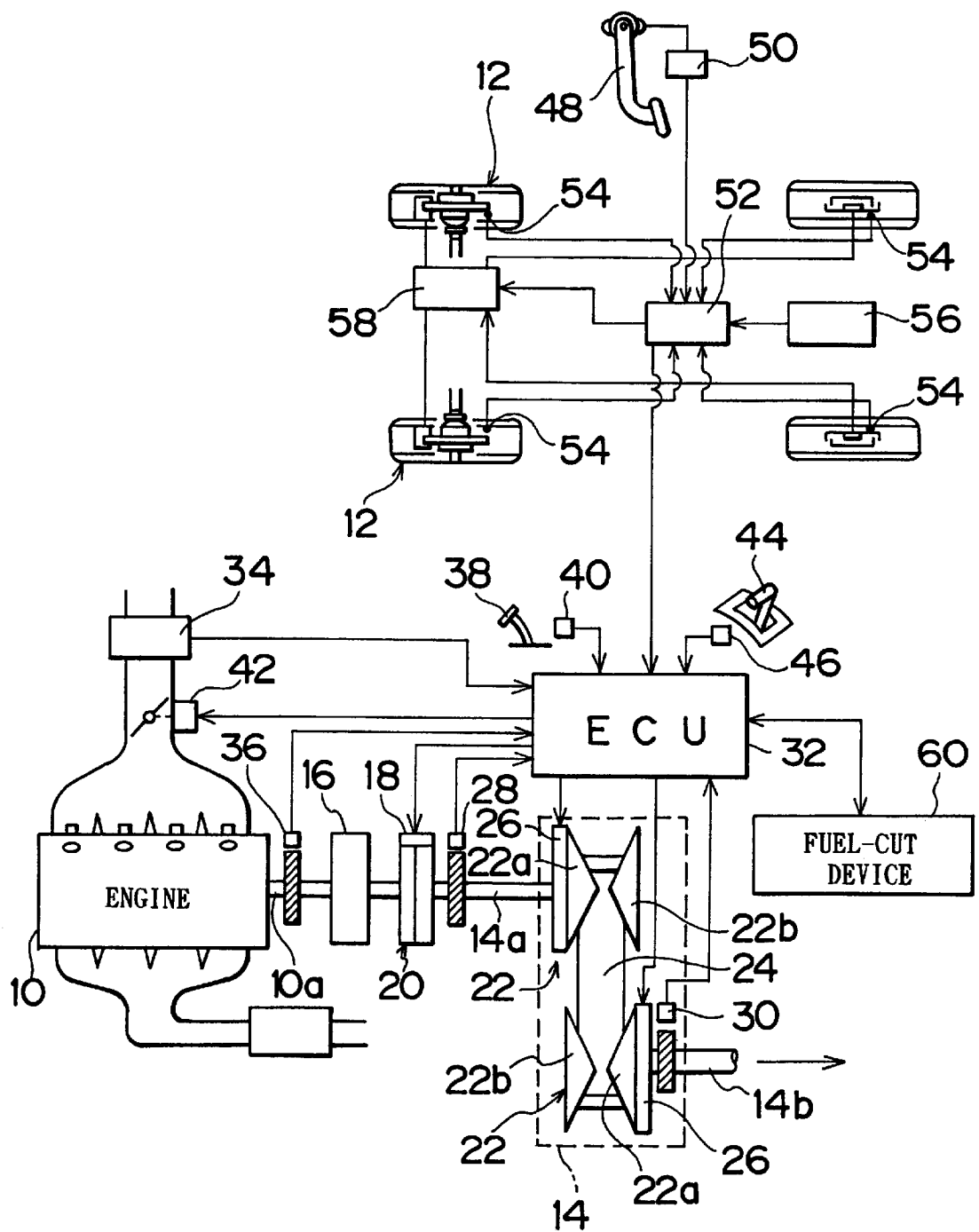
FIG. 1 is a block diagram schematically showing the structure of a vehicle equipped with a fuel-cut restoration control device according to a first embodiment of the present invention.

FIG. 1 is a conceptual view of the structure of a vehicle including a fuel-cut control device according to the embodiments of the present invention. In the vehicle according to these embodiments, a continuously variable transmission 14 (hereinafter referred to as the CVT) is disposed, especially, between an engine 10 and a drive wheel 12. Referring to FIG. 1, a crankshaft 10a of the engine 10 is coupled to an input shaft 14a of the CVT 14 through a torque converter 20, which has a forward-rearward switching mechanism 16 and a lock-up clutch 18. An output shaft 14b of the CVT 14 is coupled to the drive wheel 12 of the vehicle through a differential gear (not shown) and the like. When the lock-up clutch 16 is mechanically connected (engaged), a rotational force of the engine 10 can be transmitted to the drive wheel 12, or a rotational force of the drive wheel 12 can be transmitted to the engine 10. When the lock-up clutch 18 is disconnected (disengaged), the engine 10 is separated from the drive wheel 12 (the CVT 14) (although they are connected to each other through fluid). At this moment, the engine 10 can be self driven without being subjected to a load greater than necessary on the side of the drive wheel 12. For example, the engine 10 can maintain its idling rotation.

The CVT 14 shown in FIG. 1 is a transmission capable of continuously changing a speed-change ratio. The CVT 14 changes a speed-change ratio by changing, by means of a hydraulic pressure, a groove width of a pair of variable pulleys 22 composed of a movable rotating body 22a and a stationary rotating body 22b and so by changing a hanging diameter of a belt 24 hung on the variable pulleys 22 such that the tension of the belt 24 can be kept constant. The rate of change in groove width of the variable pulleys 22 is a speed-change rate.

Accordingly, through hydraulic pressure control, which is designed to supply a hydraulic pressure to, and release a hydraulic pressure from, actuators 26 for driving movable sheaves of the respective pulleys 22, the speed-change rate can be controlled arbitrarily. Alternatively, as the CVT, a toroidal type transmission can also be employed wherein a power roller is interposed between a pair of discs having toroidal faces and a speed-change operation is performed by inclining the power roller and thereby changing a radius determined by contact points between the power roller and the discs.

Further, even when the vehicle is in a stopped state, the torque converter 20 permits the engine 10 to idle. The forward-rearward switching mechanism 16 is provided because the engine 10 can rotate only in one direction and the CVT 14 is not equipped with an inverted motion mechanism. As the forward-rearward switching mechanism 16, a mechanism mainly composed of a planetary gear unit, a mechanism equipped with a reverse gear and a synchronous coupling unit, or the like can be employed.

Rotational speed sensors 28 and 30 are provided to detect rotational speeds of the input shaft 14a and the output shaft 14b respectively. The rotational speed sensors 28 and 30 are connected to an electronic control unit (hereinafter referred to as the ECU) 32, which is mainly composed of a microcomputer. The ECU 32 calculates a speed-change ratio of the CVT 14 based on detection signals of the rotational speed sensors 28 and 30.

An air flow sensor 34 for detecting an amount of intake air is provided in an intake pipe of the engine 10. A rotational speed sensor 36 for detecting an engine rotational speed is provided in the vicinity of the crankshaft 10a. The ECU 32 optimally controls a fuel injection amount and an ignition timing in accordance with the amount of intake air detected by the air flow sensor 34 and the engine rotational speed detected by the rotational speed sensor 36.

On the other hand, an accelerator sensor 40 for detecting an accelerator opening degree is provided in the vicinity of an accelerator pedal 38 and supplies a detected result to the ECU 32. Based on the accelerator opening degree detected by the accelerator sensor 40, the vehicle speed detected by the rotational speed sensor 30 and the engine rotational speed detected by the rotational speed sensor 36, the ECU 32 controls an amount of intake air through a throttle actuator 42, for example, such that fuel consumption is optimized.

A shift lever 44, which is disposed in the vicinity of a driver's seat, is provided with a shift sensor 46 for detecting an operational position of the shift lever 44. Based on information of a drive range or the like detected by the shift sensor 46, information of the vehicle speed and the accelerator opening degree, and the like, the ECU 32 controls movement of the lock-up clutch 18 and a speed-change ratio of the CVT 14.

Furthermore, a brake pedal sensor 50 for detecting an operational amount and an operational speed of a brake pedal 48 is provided in the vicinity of the brake pedal 48. The brake pedal sensor 50, which is disposed on a brake pedal bracket portion, supplies a voltage proportional to a depression amount of the brake pedal 48 to an anti-lock brake system (ABS) computer 52, through which information on an operational state of the brake pedal 48 is supplied to the ECU 32. In the case where the vehicle loses its operability or stability due to the locking of a wheel at the time of braking on a slippery spot such as a snow-covered road or a puddle, the ABS performs calculation of an acceleration and the like based on a wheel speed obtained from a speed sensor 54 for detecting a rotational speed of the wheel and on a deceleration obtained from an acceleration (G) sensor 56 (only for a four-wheel drive vehicle), and detects abrupt deceleration of the wheel. An ABS actuator 58 controls, through a computer, hydraulic pressures in brakes for four wheels, whereby tires are prevented from being locked. Thus, the braking performance can be secured sufficiently, and operability as well as stability of the vehicle is ensured.

Further, the ABS computer 52 constitutes part of a brake assist system (BA). If the brake pedal 48 has been depressed abruptly, the BA judges the occurrence of emergency braking by referring to a depression speed and a depression amount of the brake pedal 48. Then, the ABS computer 52 infers the driver's intention to stop the vehicle immediately and generates a greater braking force. The ABS computer 52 operates a solenoid valve attached to a brake booster and introduces atmospheric pressure into the brake booster, thereby increasing an assisting force. As a result, the braking operation by a driver who cannot depress the brake pedal forcefully is compensated for, and the braking performance including the ABS is maximized. If the driver intentionally releases a depressing force applied to the brake pedal, the BA reduces an assist amount of braking force and thus alleviates a sense of incongruity.

A fuel-cut device (computer) 60 is further connected to the ECU 32. When the vehicle decelerates, the fuel-cut device 60 mechanically connects the CVT 14, which rotates through the driving of a drive wheel, to the engine by means of the lock-up clutch 18, and cuts off the supply of fuel to the engine 10 until the vehicle reaches a predetermined running state. It is to be noted herein that the predetermined running state of the vehicle is, for example, a preliminarily set fuel-cut lower limit value (e.g., 500 rpm if defined by engine rotational speed, and 15 km/h if defined by vehicle speed). Thus, when the vehicle is in a state of deceleration which does not require an output from the engine 10, fuel is conserved so that the fuel consumption of the vehicle is improved. If the engine 10 reaches a value equal to or lower than the fuel-cut lower limit value, the fuel-cut device 60 disengages (releases) the lock-up clutch 18, sets the engine 10 free from the drive wheel (the engine 10 is connected to the drive wheel only through fluid in the torque converter 20), and resumes fuel injection for the engine 10, whereby the engine 10 is self driven and maintains its idling rotation. Then, if the accelerator pedal 38 is depressed, the ECU 32 increases an output of the engine 10, engages the lock-up clutch 18 again and transmits the output of the engine 10 to the drive wheels through the CVT 14 so as to accelerate the vehicle. Although the ECU 32, the ABS computer 52 and the fuel-cut device 60 are separate components in FIG. 1, all these components may be integrated into a single ECU. Also, the ECU 32 may be composed of an engine ECU for controlling a fuel injection amount, an injection timing and an intake air amount of the engine, and a CVT ECU for controlling a speed-change rate and a rotational speed of the CVT 14.

What is characteristic of the first embodiment is that in the case where an abrupt deceleration detector such as the ABS computer 52 or the brake pedal sensor 50 constituting the ABS and the BA has detected abrupt deceleration of the vehicle during the fuel-cut control, the fuel-cut control is suspended and forcible restoration of control out of the fuel-cut control is made so as to increase an engine output. As a result, the engine rotational speed is prevented from falling lower than a predetermined value due to the abrupt deceleration, and the possibility of engine stall is eliminated.

Figure 2:
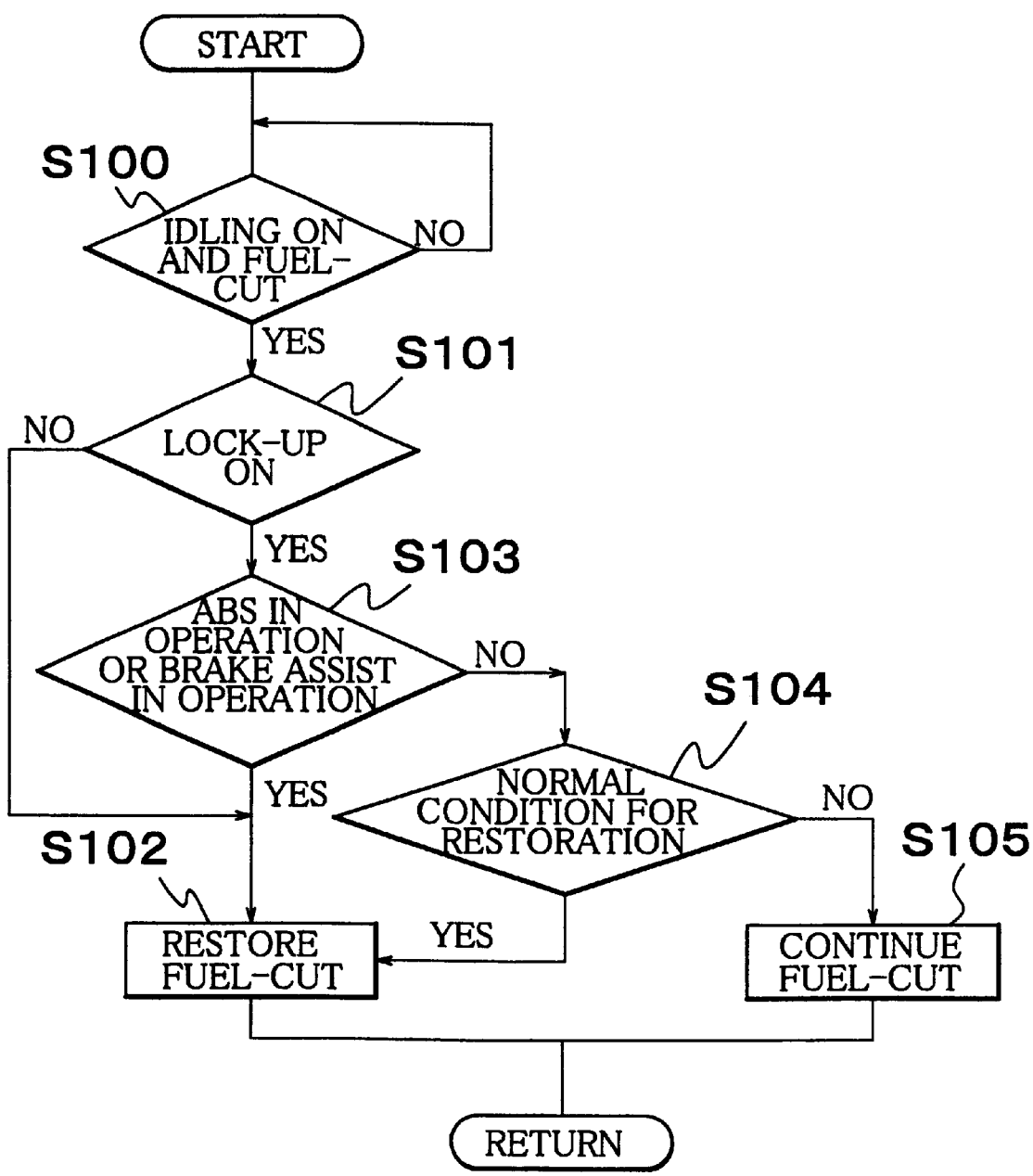
FIG. 2 is a flowchart illustrating operation of the fuel-cut restoration control device of the first embodiment.

FIG. 2 is a flowchart illustrating operation of the fuel-cut control device of the first embodiment.

The ECU 32 constantly determines whether or not an idling switch (which is turned ON when the accelerator pedal 38 is not depressed) has been turned ON and the fuel-cut state has arisen (S100). If the idling switch has been turned ON and the fuel-cut state has arisen, the ECU 32 determines whether or not the lock-up clutch 18 has been turned ON (S101). At this moment, if the lock-up clutch has not been turned ON, namely, if the engine 1 has already been disengaged from the drive wheels (the CVT 14) (connected only through fluid in the torque converter 20) and the engine is in its free state, the ECU 32 issues a command to make restoration of control out of the fuel-cut control and performs fuel injection that is required to maintain an idling rotational speed (S102).

Figure 4:
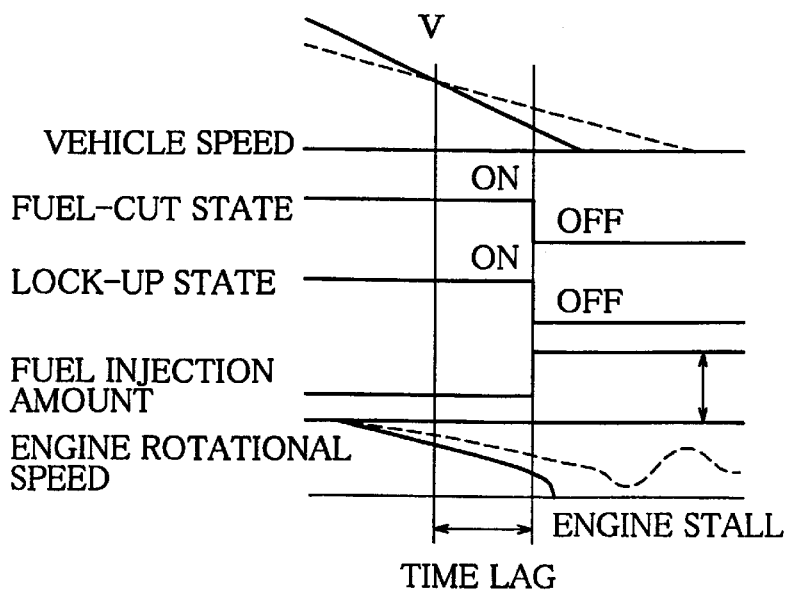
FIG. 4 is a timing chart illustrating previously employed fuel-cut restoration control.

Then in step S101, if the lock-up clutch 18 has been turned ON, namely, if the engine 10 is mechanically connected to the drive wheels (the CVT 14) by the lock-up clutch 18 and the engine 10 is driven by the drive wheels (the CVT 14), the ECU 32 detects, based on a signal from the ABS computer 52, whether or not the aforementioned ABS or BA is in operation, and determines whether or not the vehicle is in a state of abrupt deceleration (S103). If neither the ABS nor the BA is in operation, it is determined that the vehicle is in a coasting state. At this moment, even if the brake has been operated, it is determined that there is no abrupt deceleration. Restoration of control out of the fuel-cut control is then made based on a normal restoration condition. The normal restoration condition is, for example, an engine load, an engine rotational speed (e.g. equal to or lower than 500 rpm), a vehicle speed (e.g. equal to or lower than 15 km/h), or the like. The ECU 32 determines whether or not the preliminarily set restoration condition has been fulfilled. If the restoration condition has not been fulfilled, namely, if the engine load is smaller than a set value or if the engine rotational speed or the vehicle speed is greater than a predetermined value, it is determined that there is a sufficient amount of torque still available at the engine 10, and that there is no possibility of engine stalling. Therefore, the fuel-cut control is continued (S105). If it is determined in step S104 that the normal restoration condition has been fulfilled, the ECU 32 issues a command to make a restoration of control out of the fuel-cut control. That is, the lock-up clutch 18 is disengaged and fuel injection is resumed, whereby the engine 10 is maintained at an idling rotational speed (S102). At this moment, it is useful to refer to a timing chart shown in FIG. 4, in which the vehicle speed and the engine rotational speed change as indicated by broken lines.

Figure 3:
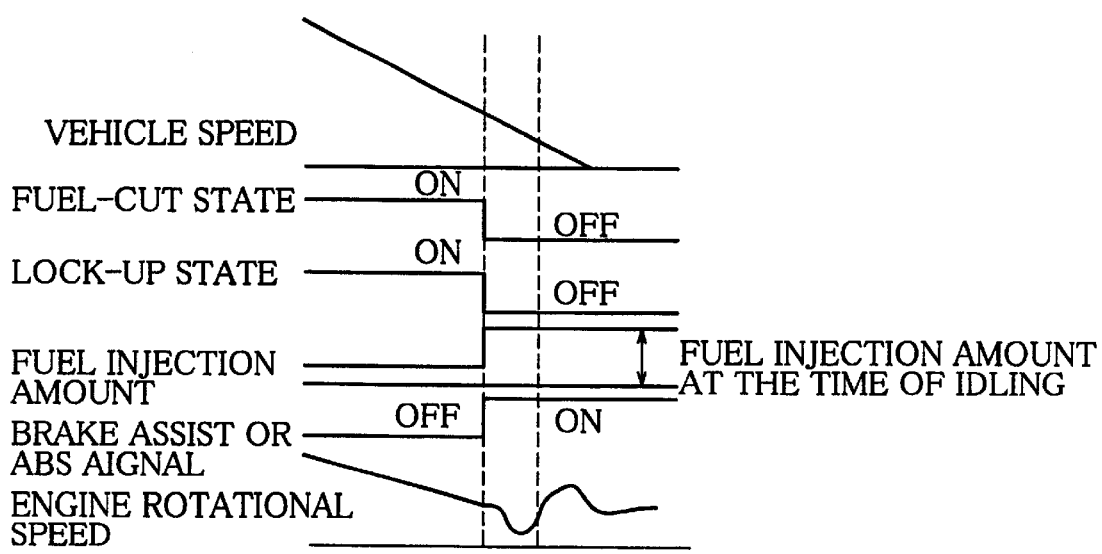
FIG. 3 is a timing chart illustrating fuel-cut restoration control of the first embodiment.

If the ECU 32 detects that the ABS or the BA has been activated during the fuel-cut control, the ECU 32 determines that the driver has issued a command to abruptly decelerate the vehicle, and issues a command to the fuel-cut device 60 to make forcible restoration of fuel injection and lock up clutch control out of the fuel-cut control independently of the aforementioned engine load, engine rotational speed and vehicle speed. That is, the operation proceeds to step S102 where the lock-up clutch 18 that has been engaged is disengaged, fuel injection is resumed and the torque of the engine 10 is increased or maintained so that the engine 10 is maintained at an idling rotational speed. The relationship among the timings for operating respective control flags, the fuel injection timing, the engine rotational speed and the like is shown in a timing chart in FIG. 3. The criterion for judging the occurrence of abrupt deceleration is suitably selected depending on the type of the vehicle and the performance and response of the engine 10. For example, when the deceleration is 9.8 m/s2, it is determined that the vehicle is in a state of abrupt deceleration.

Thus, it is determined whether or not the vehicle is in a state of abrupt deceleration, based on an ABS signal or a BA signal that triggers abrupt deceleration control. Thereby, actual start of abrupt deceleration of the vehicle is detected simply, without making an intricate calculation (calculation of an engine rotational speed, a change in deceleration and the like) (without including a time lag resulting from the calculation), and forcible restoration of control out of the fuel-cut control can be made. As a result, fuel injection for the engine 10 can be resumed before the rotational speed of the engine 10 becomes equal to or lower than the predetermined value. Thus, it is possible to securely prevent the engine 10 from going into a stall. Such detection control can be made possible by additionally arranging a plurality of sensors. However, by making use of control signals from the ABS and the BA that have been getting increasingly popular for installation in recent years, it becomes possible to realize the detection control at a low cost. Further, the use of a trigger signal for the abrupt deceleration control makes it possible to perform the detection control precisely.

In the aforementioned embodiment, there is shown an example wherein the fuel-cut restoration control device is composed of the ECU 32, the brake pedal sensor 50, the ABS computer 52 and the like. As long as abrupt deceleration of the vehicle can be detected, substantially the same effect can be obtained through other constructions. For example, abrupt deceleration of the vehicle may also be detected based on an operational amount or an operational speed of the brake pedal detected by the brake pedal sensor 50 provided in the vicinity of the brake pedal 48. That is, as long as abrupt deceleration of the vehicle can be detected, the use of signals other than those from the ABS and the BA enables achievement of substantially the same effect.

Figure 5:
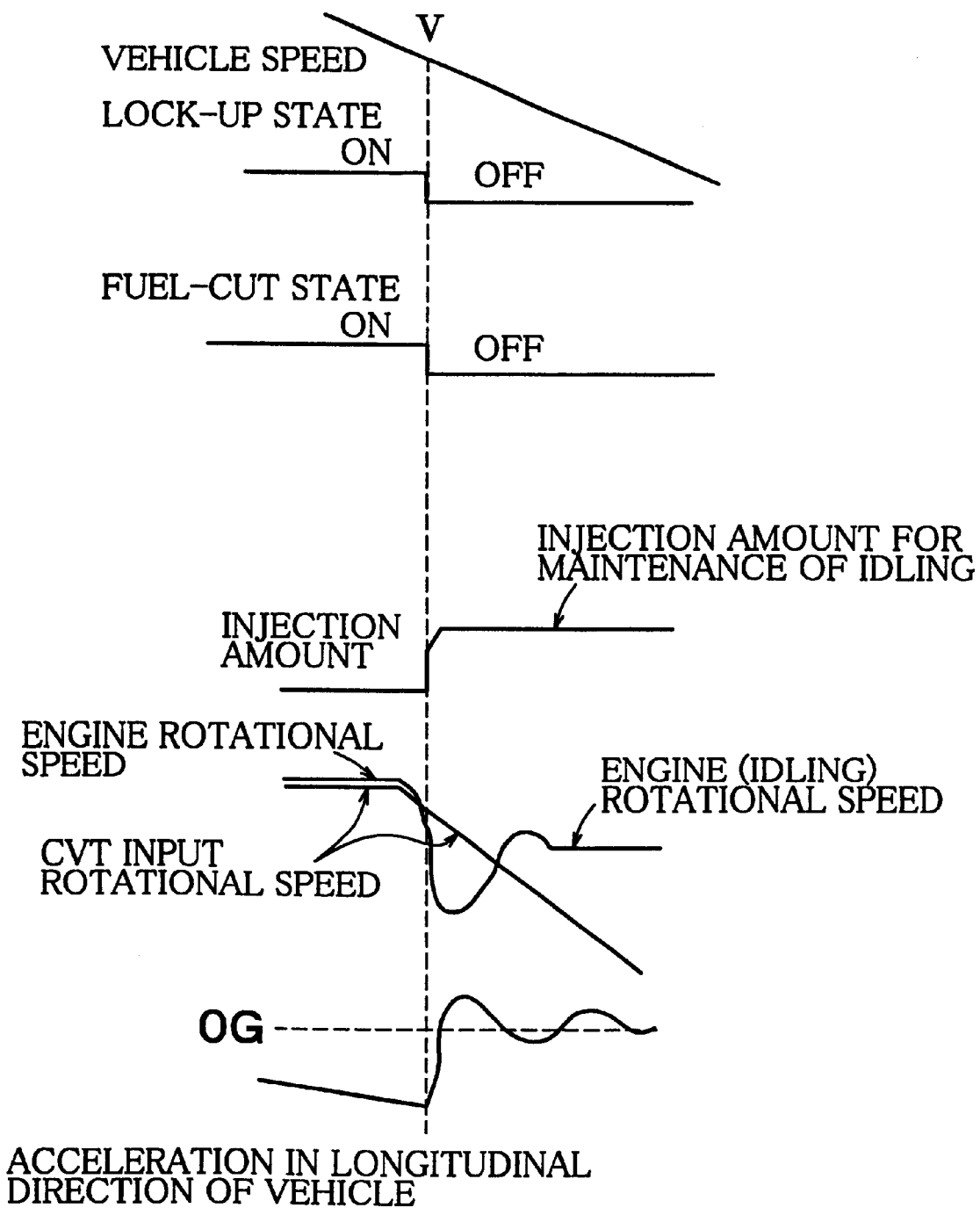
FIG. 5 is a timing chart showing engine control in the case where, as usual, there is no operation of disengaging a lock-up clutch.

By the way, if the supply of fuel has been cut off by the aforementioned fuel-cut device, in response to a decrease in vehicle speed, the rotational speed of the engine that is being driven decreases or the engine torque decreases. If an attempt is made to maintain the engine in an idling state with the torque of the driven engine having decreased, it is necessary to set the engine free (connected only through fluid), terminate the fuel-cut operation and resume fuel injection. However, a torque discrepancy between the engine torque generated in response to the resumption of fuel injection and the torque outputted from the engine arises immediately before setting the engine free (in a driven state). Hence, as indicated by the timing chart in FIG. 5, when disengaging the lock-up clutch (the lock-up state ON OFF) and resuming fuel injection (the fuel-cut state ON OFF), the vehicle undergoes a shock resulting from abrupt torque fluctuations (an acceleration in the longitudinal direction of the vehicle), which causes vehicle passengers much discomfort.

Also, the actual generation and increase of engine torque is generally retarded with respect to issuance of a command to the engine to perform fuel injection. Therefore, if the lock-up clutch is disengaged and the engine is set free, there arises a concern that the engine rotational speed might undershoot a predetermined rotational speed and that the engine might stall.

A second embodiment of the present invention has been conceived to solve such a problem. What is characteristic of the second embodiment is that if the state of the engine 10 has reached a value equal to or lower than a fuel-cut lower limit value, the lock-up clutch 18 is disengaged (released), the engine 10 is set free from the drive wheels, and fuel injection for the engine 10 is resumed so that the engine 10 is self driven. That is, after the lock-up clutch 18 has been disengaged, the output of the engine 10 is increased from an idling output by a predetermined amount, whereby the torque discrepancy resulting from disengagement of the lock-up clutch 18 is reduced. To be more specific, an engine output greater than that required to maintain idling rotation is generated so as to complement the torque, whereby the occurrence of a shock resulting from the torque discrepancy or the undershooting of the engine rotational speed is prevented.

Figure 6:
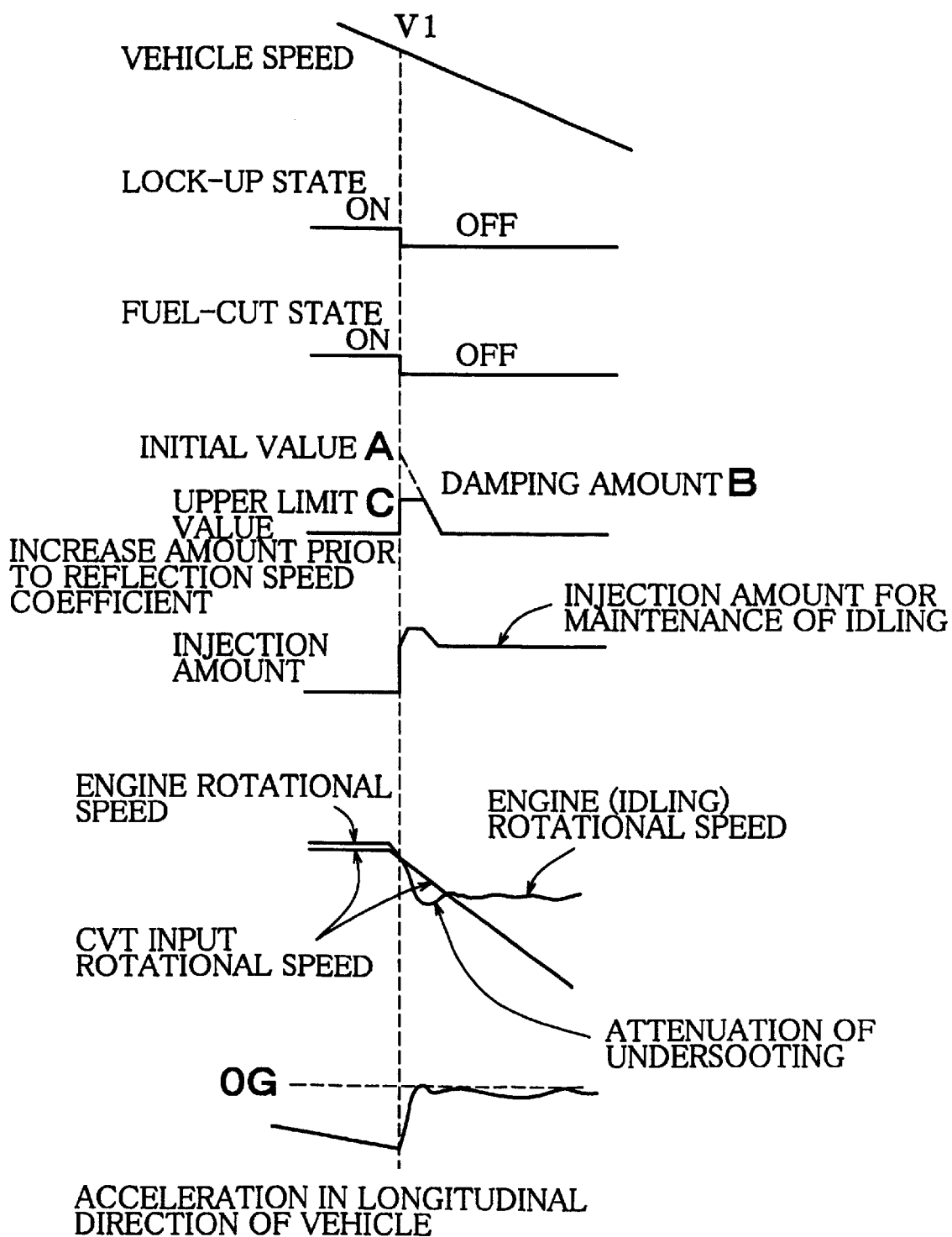
FIG. 6 is a timing chart showing fuel restoration control for a fuel-cut device according to a second embodiment of the present invention.
Figure 7:
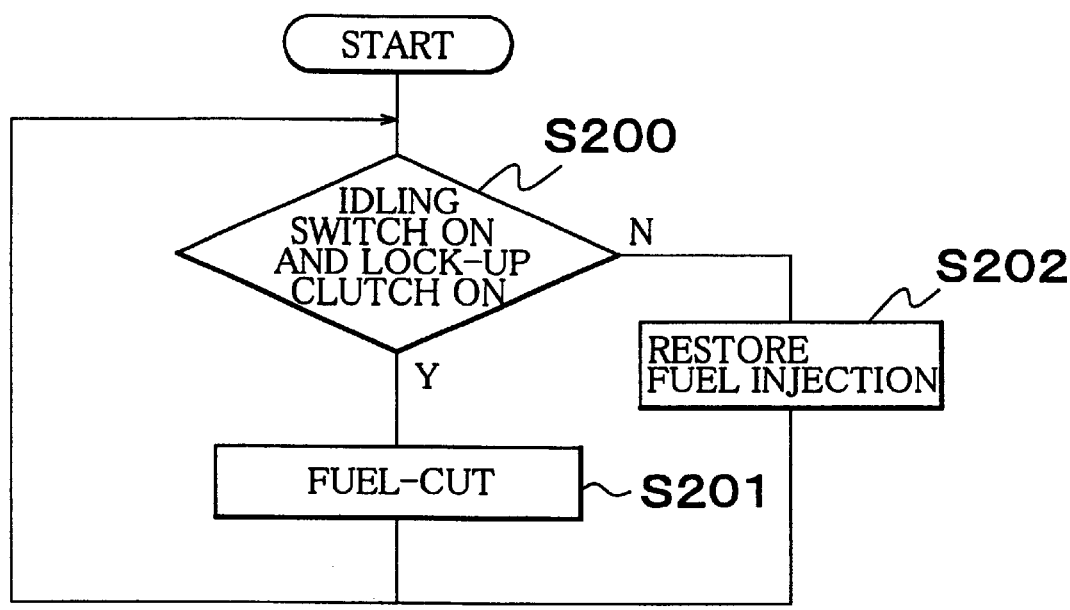
FIG. 7 is a flowchart for determining whether or not fuel-cut operation is to be performed in the second embodiment.
Figure 8:
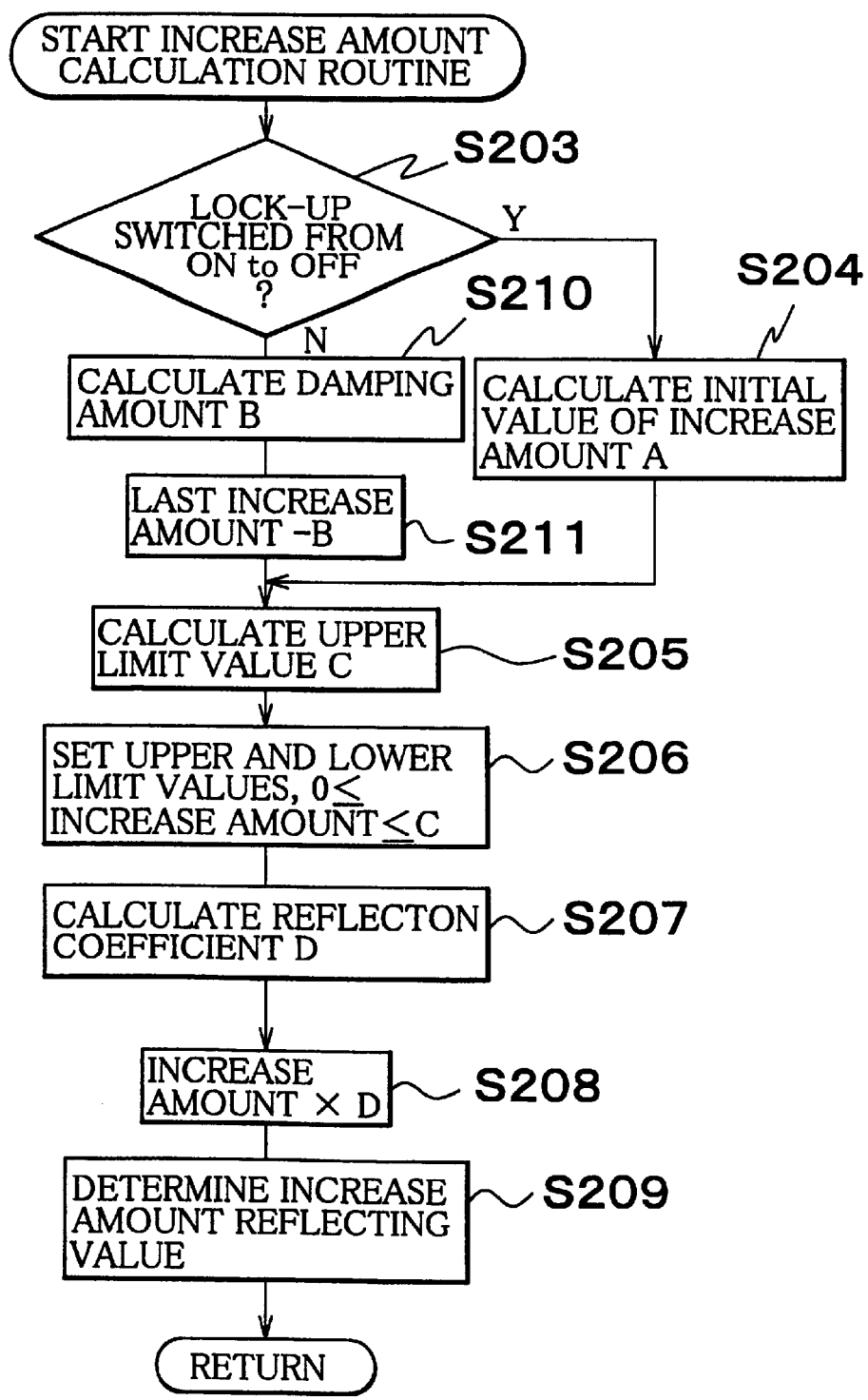
FIG. 8 is a flowchart showing a fuel increase amount calculation routine of the second embodiment.

FIG. 6 is a timing chart showing control flags relating to the control of the second embodiment, a fuel increase amount, a fuel injection amount, an engine rotational speed, a CVT rotational speed and the like. FIGS. 7 and 8 are flowcharts of the control of the second embodiment.

As shown in the flowchart in FIG. 7, the ECU 32 constantly detects whether or not the idling switch has been turned ON, and detects whether or not the lock-up clutch 18 has been turned ON, namely, whether or not the engine 10 is in engagement with the CVT 14 (including a state where the engine 10 is in partial engagement with the CVT 14 and thus can slip with respect thereto) (S200). In the present embodiment, there is shown an example in which an idling switch is used as means for detecting an engagement state of the engine 10 and the CVT 14. However, it is also possible to use a device for detecting opening degrees of the throttle valve and the accelerator. If the idling switch has been turned ON and the lock-up clutch has been turned ON, the ECU 32 causes the fuel-cut device 60 to perform the fuel-cut operation, namely, to prohibit fuel injection for the engine 10, thus reducing consumption of fuel (S201). On the other hand, if either the idling switch or the lock-up clutch has been turned OFF, or if both the idling switch and the lock-up clutch have been turned OFF, the ECU 32 issues a command to the fuel-cut device 60 to restore fuel injection (S202).

Figure 9A:
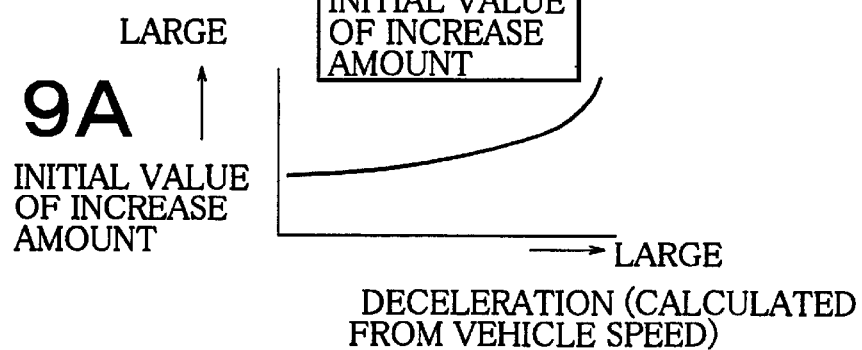
FIG. 9A is a map for calculating an initial increase value when calculating a fuel increase amount in the second and third embodiments.

At this moment, the amount of fuel injected for the engine 10 is determined according to an increase amount calculation routine shown in a flowchart in FIG. 8. First of all, the ECU 32 determines whether or not the lock-up clutch 14 has been switched from ON to OFF (S203). The switching of the lock-up clutch 18 from ON to OFF can be detected by directly checking movement of the lock-up clutch 18 by means of a sensor or the like. However, the switching of the lock-up clutch 18 is made, for example in a fuel-cut state, when the vehicle speed becomes equal to or lower than V1 (15 km/h). Therefore, as shown in FIG. 6, the switching of the lock-up clutch 18 can also be judged based on a change in vehicle speed. If the lock-up clutch 18 has been switched from ON to OFF, the ECU 32 calculates an initial value A of fuel increase amount based on a calculation map that has preliminarily been determined on the basis of a deceleration (calculated from a change in vehicle speed), as shown in FIG. 9A (S204). The initial value A of fuel increase amount is so set as to become greater in proportion to an increase in deceleration.

That is, the more abruptly the vehicle decelerates, the greater the initial value A becomes. Then, as shown in FIG. 9C, the ECU 32 calculates an upper limit value C at the time of increasing fuel, based on a deceleration (calculated from a change in vehicle speed) (S205). The ECU 32 then sets upper and lower limit values (0 fuel increase amount C) of the fuel increase amount (S206). As soon as the lock-up clutch 18 is disengaged, the ECU 32 requires an engine output greater than that intrinsically required to maintain idling rotation of the engine. However, the upper and lower limit values of the fuel increase amount are set with a view to preventing the requirement from becoming too severe. The more abruptly the vehicle decelerates, the greater the upper limit value becomes.

Figure 9B:
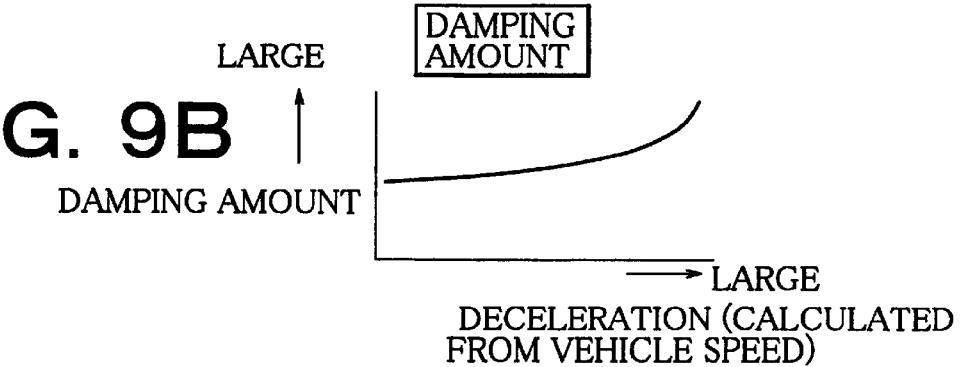
FIG. 9B is a map for calculating a damping amount when calculating a fuel increase amount in the second and third embodiments.
Figure 9C:
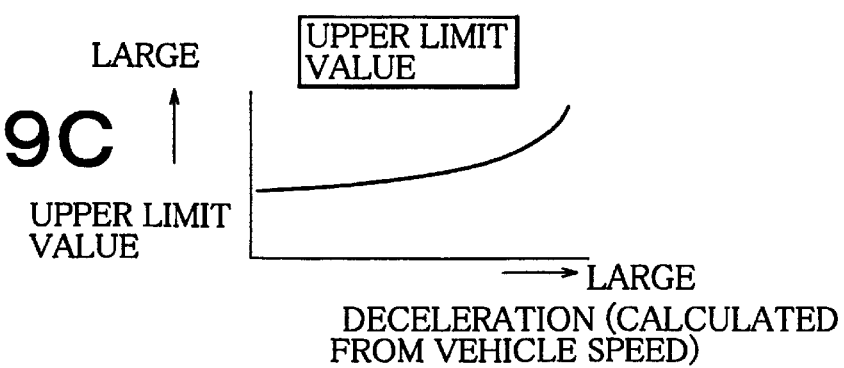
FIG. 9C is a map for calculating an upper limit value of a fuel increase amount in the second and third embodiments.
Figure 9D:
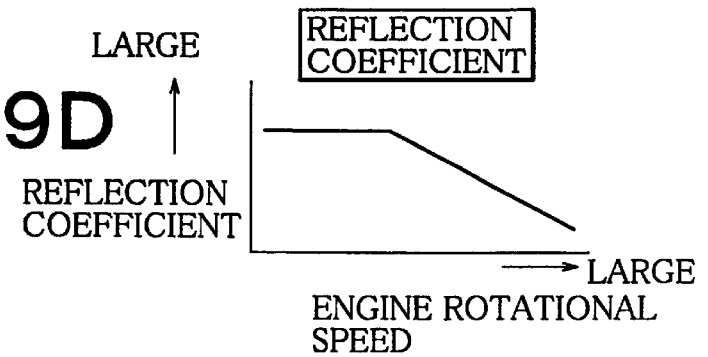
FIG. 9D is a map for calculating a reflection coefficient when calculating a fuel increase amount in the second and third embodiments.

Furthermore, as shown in FIG. 9D, the ECU 32 determines a reflection coefficient D of fuel increase amount based on a rotational speed of the engine 10 (S207). The reflection coefficient D is so set as to prevent the output of the engine 10 from becoming excessive through the supply of an excessive amount of fuel. As shown in FIG. 9D, the reflection coefficient D is so set as to decrease when the engine rotational speed becomes higher than a predetermined rotational speed. When the rotational speed of the engine 10 is higher, the fuel increase amount is made smaller.

The ECU 32 multiplies the reflection coefficient D by the fuel increase amount which has upper and lower limit values (S208). The ECU 32 determines a fuel increase reflection value, namely, an increase amount of fuel that is actually supplied to the engine 10 at the time of disengagement of the lock-up clutch 18 (S209). The operation then proceeds to the next processing cycle, namely, to step S203.

On the other hand, if the ECU 32 determines in step S203 that the lock-up clutch 18 has already been switched OFF, the ECU 32 calculates a damping amount B of fuel that is determined based on a deceleration as shown in FIG. 9B (S210), in order to gradually restore a predetermined fuel injection amount, for example, a fuel injection amount required to obtain an engine output necessary for the maintenance of idling rotation of the engine 10, out of the increased fuel feed amount. The damping amount B is also so set as to increase in proportion to an increase in deceleration of the vehicle. A value obtained by subtracting the damping amount B calculated in (S210) from the fuel increase amount calculated in the last processing cycle (a transition to this step is made after the fuel increase amount has once been calculated) is defined as a renewed fuel increase amount. Then, the processings in (S211) and (S205) through (S209) are carried out to determine a current fuel increase amount.

As a result, as shown in the timing chart in FIG. 6, as soon as the lock-up clutch 18 is turned OFF and the fuel-cut state is turned OFF, namely, as soon as fuel injection control for the engine 10 is restored, fuel of an amount greater than that required to maintain idling rotation of the engine 10 by a predetermined amount is injected. As a result, the output of the engine 10 is complemented, the torque discrepancy at the time of disengagement of the lock-up clutch 18 is reduced, and the shock caused at the time of a transition to an idling state made by the engine 10 (acceleration in the longitudinal direction of the vehicle) is attenuated. Further, since the engine output at the time of disengagement of the lock-up clutch 18 is complemented, the undershooting of the engine rotational speed is attenuated and the engine is securely prevented from stalling. The fuel that has been increased at the time of disengagement of the lock-up clutch 18 gradually decreases, as the damping amount B is reduced step by step with the lapse of time from disengagement of the lock-up clutch 18. The fuel increase amount finally becomes zero, and the fuel injection amount finally converges to the idling maintenance injection amount.

The ECU 32 changes a fuel injection amount according to a deceleration of the vehicle as shown in FIGS. 9A through 9C. FIG. 10A is a timing chart relating to the increasing of fuel amount when the deceleration is small. FIG. 10B is a timing chart relating to the increasing of fuel amount when the deceleration is great. If the vehicle decelerates abruptly, the torque discrepancy becomes great. Therefore, when the deceleration is great, the control is started at an earlier timing than when the deceleration is small, namely, at a timing when the vehicle speed reaches V2. In order to sufficiently complement the torque discrepancy at this moment, the increase amount of injected fuel and the rate of changing amount of injected fuel are increased. In this manner, the shock delivered to the vehicle is attenuated and the engine is inhibited from [going into a stall] stalling, in accordance with a running state of the vehicle.

In the aforementioned second embodiment, after it is detected that the lock-up clutch 18 has been switched from ON to OFF, restoration of injection of an increased amount of fuel is made. However, in fact, even if fuel has been injected to the engine 10, there is a time lag until the engine output increases. For this reason, as can be seen from FIGS. 10A and 10B, it is difficult to completely eliminate the undershooting of the rotational speed of the engine 10.

What is characteristic of a third embodiment of the present invention is that fuel restoration is started prior to disengagement of the lock-up clutch 18 and the output increasing control of the engine 10 is gradually started so as to completely eliminate the undershooting of the rotational speed of the engine 10, and that the change in engine rotational speed is smoothed so as to attenuate a shock delivered to the vehicle and inhibit engine stall securely and effectively.

Figure 11:
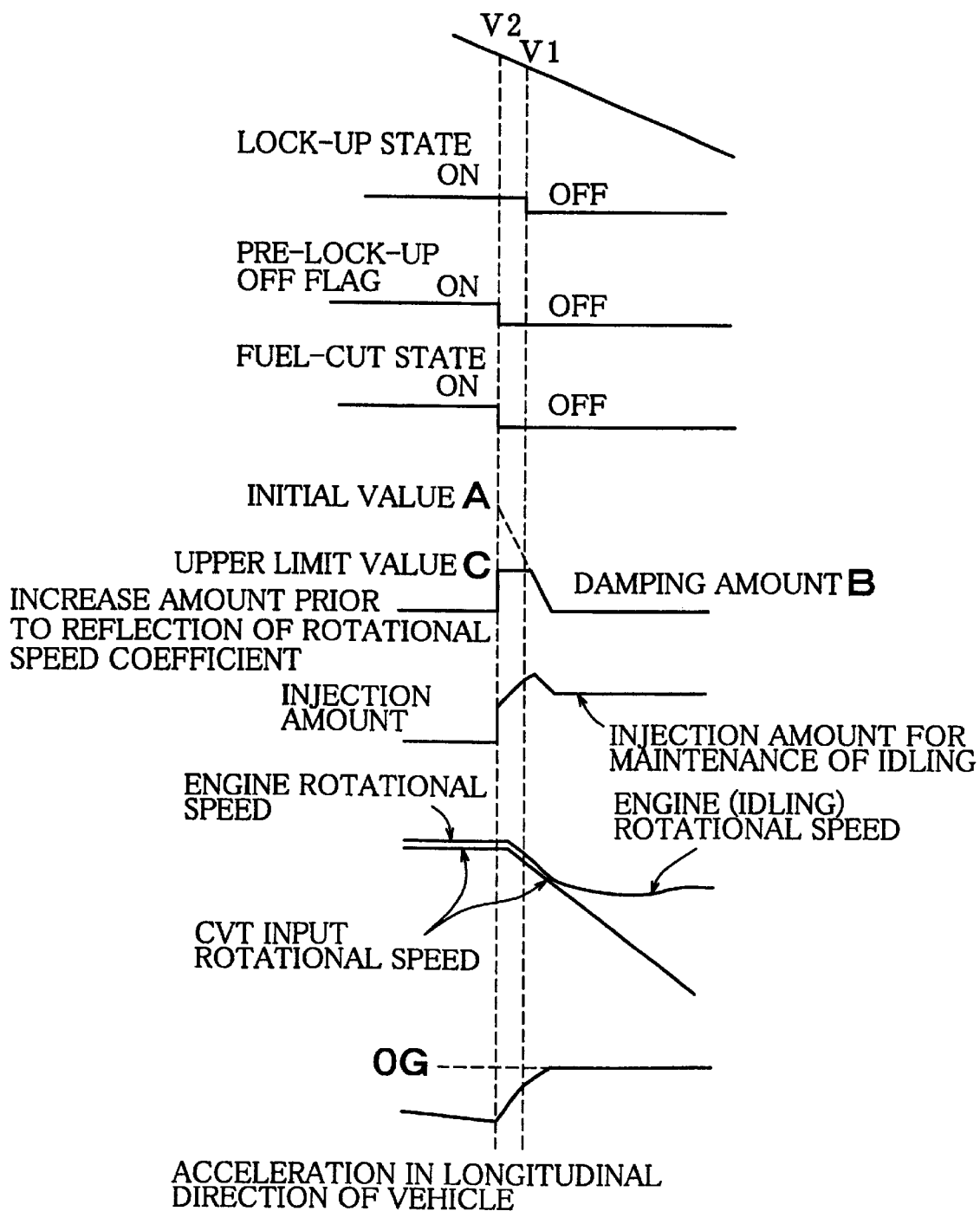
FIG. 11 is a timing chart of fuel restoration control of a fuel-cut device according to a third embodiment of the present invention.
Figure 12:
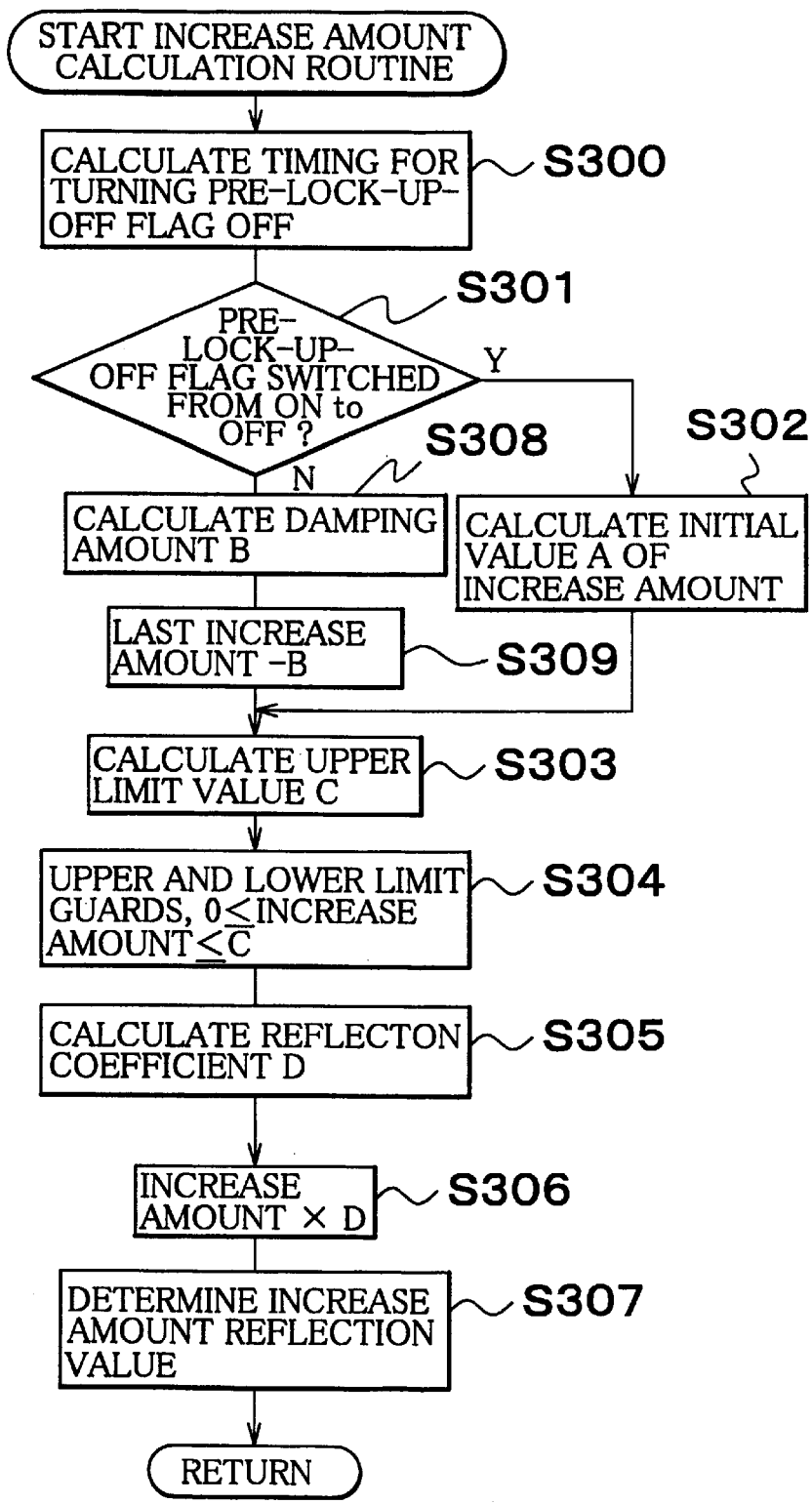
FIG. 12 is a flowchart showing a fuel increase amount calculation routine of the third embodiment.

FIG. 11 is a timing chart showing a control flag used for the control of the third embodiment, a fuel increase amount, a fuel injection amount, an engine rotational speed, a CVT rotational speed and the like. FIG. 12 is a control flowchart of the third embodiment.

As shown in the timing chart in FIG. 11, the switching of the lock-up clutch 18 from ON to OFF is judged by confirming whether or not the vehicle speed has become equal to or lower than a predetermined value, as is the case with the second embodiment. However, as described above, if fuel restoration is made simultaneously with disengagement of the lock-up clutch 18, the undershooting of the engine rotational speed cannot be eliminated. Thus, according to the third embodiment, as shown in the timing chart in FIG. 11, a pre-lock-up-OFF flag is used to advance the timing for fuel restoration.

That is, in the flowchart shown in FIG. 12, if the vehicle has entered a state of deceleration, the ECU 32 calculates a timing for turning a pre-lock-up-OFF flag OFF (S300). This pre-lock-up-OFF flag is turned OFF, for example, a predetermined time prior to the time when the vehicle speed reaches V1, namely, when the turning-OFF of the preliminarily set lock-up clutch is judged. The timing for turning the pre-lock-up-OFF flag OFF can be inversely calculated from a deceleration calculated from the vehicle speed. Also, more simply, it may be possible to set a flag operation vehicle speed V2 (e.g. 17 km/h) for a vehicle speed V1 (e.g. 15 km/h) so as to turn the pre-lock-up-OFF flag OFF. The ECU 32 then determines whether or not the pre-lock-up-OFF flag has actually been switched from ON to OFF (S301). The judgment of such change can also be made, for example, by confirming whether or not the vehicle speed has become equal to or lower than V2 (17 km/h).

If the pre-lock-up-OFF flag has been switched from ON to OFF, the ECU 32 calculates an initial value A of fuel increase amount that is preliminarily determined based on a deceleration (calculated from a change in vehicle speed) as shown in FIG. 9A, as is the case with the second embodiment (S302). After that, as is the case with the second embodiment, the upper limit value C at the time of the increasing of fuel is calculated based on a deceleration (calculated from a change in vehicle speed) (S303), and upper and lower limit values (0≦fuel increase amount≦C) are set with respect to the fuel increase amount (S304). Furthermore, as shown in FIG. 9D, the ECU 32 determines a reflection coefficient D of fuel injection amount, which is based on a rotational speed of the engine 10 (S305). The reflection coefficient D is multiplied by the fuel increase amount having upper and lower limit values (S306). Then, the reflection value of fuel increase amount, namely, the increase amount of fuel that is actually supplied to the engine 10 upon change of the pre-lock-up-OFF flag is determined (S307).

On the other hand, if the ECU 32 determines in (S301) that the pre-lock-up-OFF flag has not been turned OFF, the ECU 32 calculates a damping amount B of fuel that is determined based on a deceleration as shown in FIG. 9B (S308), in order to gradually restore a predetermined fuel injection amount, for example, a fuel injection amount required to obtain an engine output necessary for the maintenance of idling rotation of the engine 10, out of the increased fuel feed amount. A value obtained by subtracting the damping amount B calculated in step S308 from the fuel increase amount calculated in the last processing cycle is defined as a renewed fuel increase amount (S309). Then, the processings from step S303 to step S307 are carried out to determine a current fuel increase amount.

As a result, as shown in the timing chart in FIG. 11, as soon as the pre-lock-up-OFF flag is turned OFF and the fuel-cut state is turned OFF, namely, as soon as fuel injection for the engine 10 is restored, fuel of an amount greater than that required to maintain idling rotation of the engine 10 by a predetermined amount is injected. At this moment, the lock-up clutch 18 is still engaged. In this state, the engine output for the engine 10 is complemented, whereby it becomes possible to eliminate a torque discrepancy by the time when the lock-up clutch 18 is disengaged. Because the torque discrepancy is eliminated, even if the lock-up clutch 18 has been disengaged, the torque does not fluctuate and the engine rotational speed does not undershoot. That is, the shock delivered to the engine 10 at the time of a transition to an idling state (acceleration in the longitudinal direction of the vehicle) is further attenuated in comparison with the second embodiment. Further, since the engine output is complemented before the lock-up clutch 18 is disengaged, it is possible to eliminate the possibility of the undershooting of the engine rotational speed and to securely prevent the engine from stalling. The fuel that has been increased at the time of disengagement of the lock-up clutch 18 gradually decreases, as the damping amount B is reduced step by step with the lapse of time from disengagement of the lock-up clutch 18. The fuel increase amount finally becomes zero, and the fuel injection amount finally converges to the idling maintenance injection amount.

Figure 13:
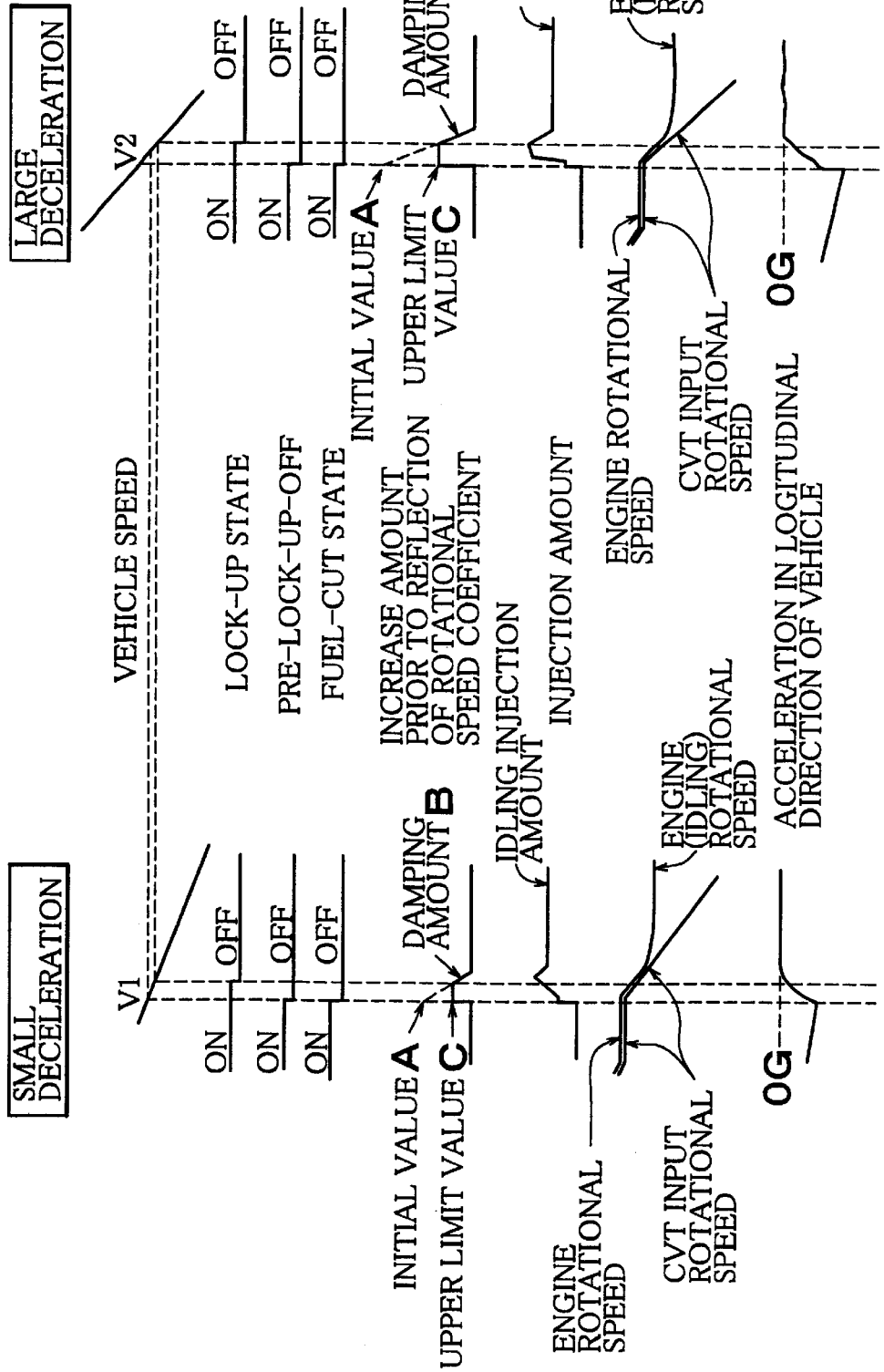
FIG. 13A is a timing chart of fuel control when the decelerating force is small in the third embodiment.
FIG. 13B is a timing chart of fuel control when the decelerating force is great in the third embodiment.

Also in the third embodiment, the fuel increase amount changes in accordance with a deceleration as shown in FIGS. 9A through 9C. FIG. 13A is a timing chart relating to the fuel increase amount in the case where the deceleration is small. FIG. 13B is a timing chart relating to the fuel increase amount in the case where the deceleration is great. That is, the torque discrepancy becomes great in the case of abrupt deceleration. Thus, the control is started at a timing when the vehicle speed reaches V2, namely, a timing earlier than in the case where the deceleration is small. In order to sufficiently complement the torque discrepancy, the fuel increase amount is increased, whereby the shock delivered to the vehicle is attenuated and the engine stall is inhibited in accordance with a running state of the vehicle.

Thus, restoration of fuel injection is gradually started prior to disengagement of the lock-up clutch 18. Consequently, the shock caused at the time of restoration of control out of the fuel-cut operation is attenuated, and the shock or the undershooting of the engine rotational speed resulting from disengagement of the lock-up clutch 18 can securely be prevented.

In the aforementioned second and third embodiments, a construction wherein the fuel injection amount is made greater than an injection amount required for idling rotation based on a change in disengagement state of the lock-up clutch 18 has been described. In this construction, the fuel increase amount is also determined based on a deceleration. However, any construction wherein the engine output is made greater than an engine output required for idling rotation just after disengagement of the lock-up clutch 18 can achieve substantially the same effect as in the second and third embodiments. That is, the fuel increase amount, the rate of changing fuel amount and the like, and the method of calculating these amounts can suitably be selected.

Further, the lock-up clutch operates hydraulically. Therefore, even if a lock-up-ON flag has been turned OFF, there is a time lag before the lock-up clutch is actually disengaged. Also, the operation time for disengagement varies depending on external factors. In this case, as shown in a timing chart in FIG. 14, even if a predetermined time has elapsed (a post-lock-up-OFF counter B) after the turning-OFF of the lock-up-ON flag and the turning-OFF of a fuel-cut-ON flag at the vehicle speed V, mechanical connection between the [side of the] engine and the [side of the] CVT (the drive wheel) is maintained. As a result of a decrease in CVT input rotational speed (a decrease in rotational speed of the drive wheel), the engine rotational speed decreases. At this moment, fuel of an amount that is sufficient to maintain idling rotation is injected. However, since the engine output achieved by the fuel is small, the CVT input rotational speed decreases and the engine rotational speed decreases. As a result, the engine rotational speed drops below its limit value before completion of disengagement of the lock-up clutch, which causes a problem of engine stall.

A fourth embodiment of the present invention has been made with a view to solving such a problem. The fourth embodiment is characterized as follows. That is, when the vehicle reaches a predetermined running state during deceleration of the vehicle and restoration of control out of the fuel-cut operation by the fuel-cut device is made simultaneously with disengagement of the lock-up clutch, if a delay of disengaging operation of the lock-up clutch has been detected based on a difference between a rotational speed of the engine and a rotational speed [on] of the [side of the] vehicle (actually the CVT), the engine output is made greater than an idling maintenance output so as to prevent the engine rotational speed from decreasing.

Figure 14:
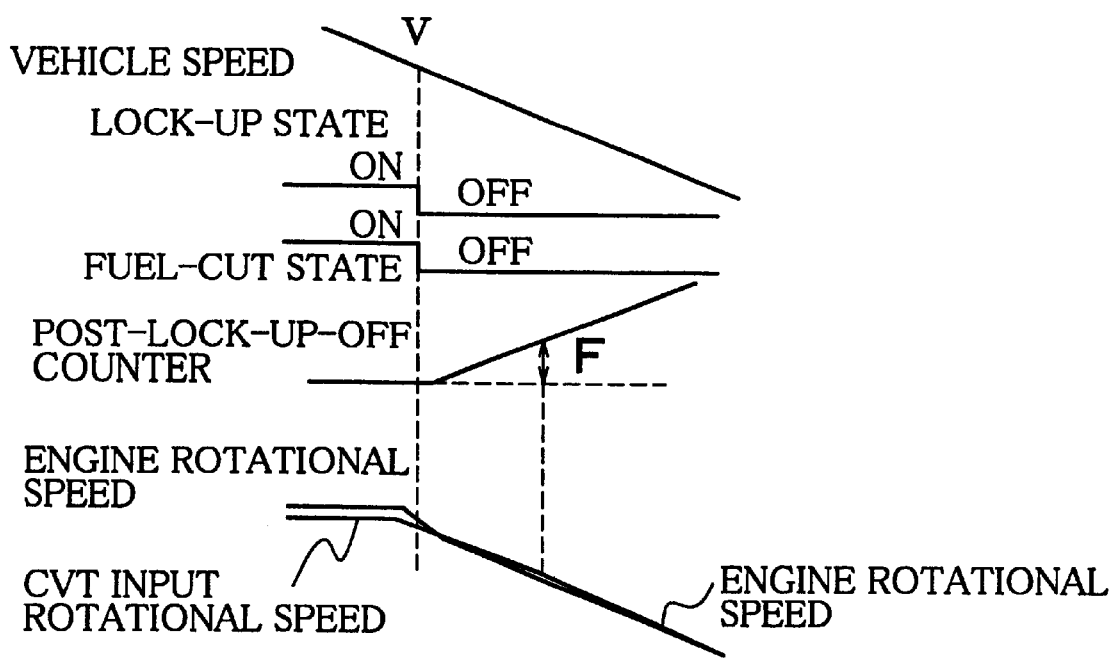
FIG. 14 is a timing chart illustrating a fall in engine rotational speed in the case where there is a delay in the operation of disengaging the lock-up clutch.
Figure 15:
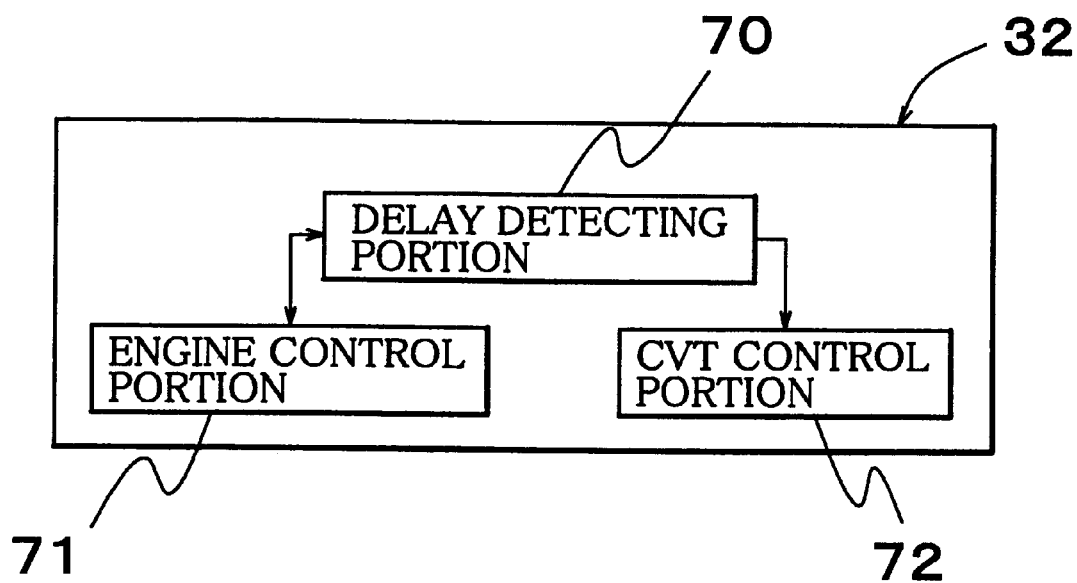
FIG. 15 is a block diagram schematically showing the structure of a control device (ECU) equipped with a delay detecting portion according to fourth, fifth and sixth embodiments of the present invention.

As shown in FIG. 15, the ECU 32 is provided with, for example, an engine control portion 71 and a CVT control portion 72. The engine control portion 71, to which data concerning an accelerator opening degree, an engine rotational speed and the like are inputted, controls a fuel injection amount, an injection timing, an amount of intake air and the like for the engine 10, and exchanges data with the fuel-cut device 10. A CVT control portion 72 controls a speed-change rate and a rotational speed of the CVT 14 based on an exchange of data with the engine control portion 71. Further, the ECU 32 has a delay detecting portion (delay detection means) 70, which detects a delay of disengaging operation of the lock-up clutch 18 disposed between the engine 10 and the CVT 14 based on a difference in rotational speed between the engine 10 and the CVT 14 (the drive wheel). If the delay detecting portion 70 has detected a delay of disengaging operation of the lock-up clutch 18, the ECU 32 functions as an output amplifier for increasing an engine output by a predetermined amount from the idling maintenance output, thus increasing the engine output by the predetermined amount. Although FIG. 14 shows a construction wherein the ECU 32 incorporates the delay detecting portion 32, the function of the delay detecting portion may be separated from the ECU 32.

Figure 16:
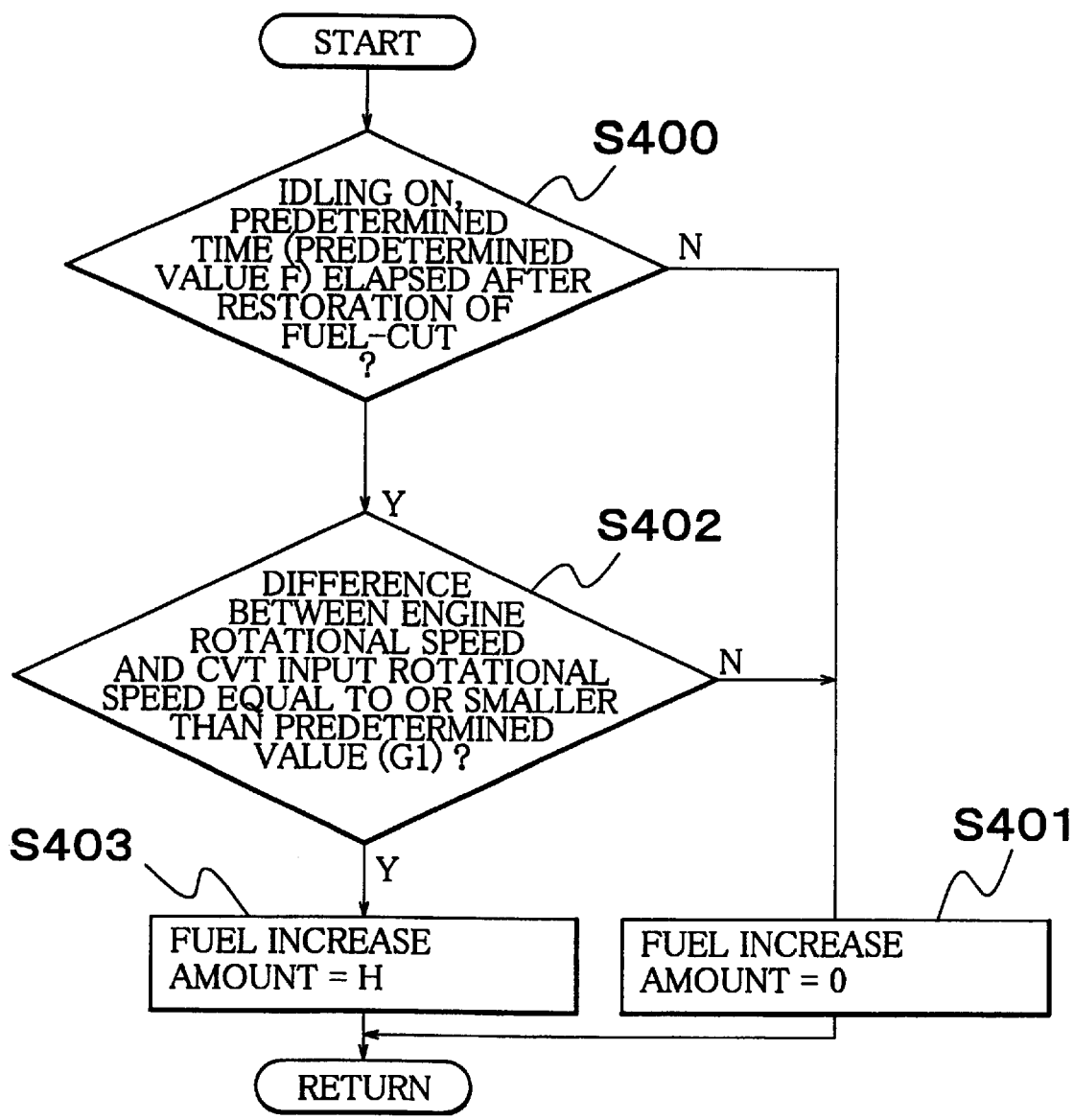
FIG. 16 is a flowchart illustrating a procedure of calculating an amount of increase in engine output in the fourth embodiment.
Figure 17:
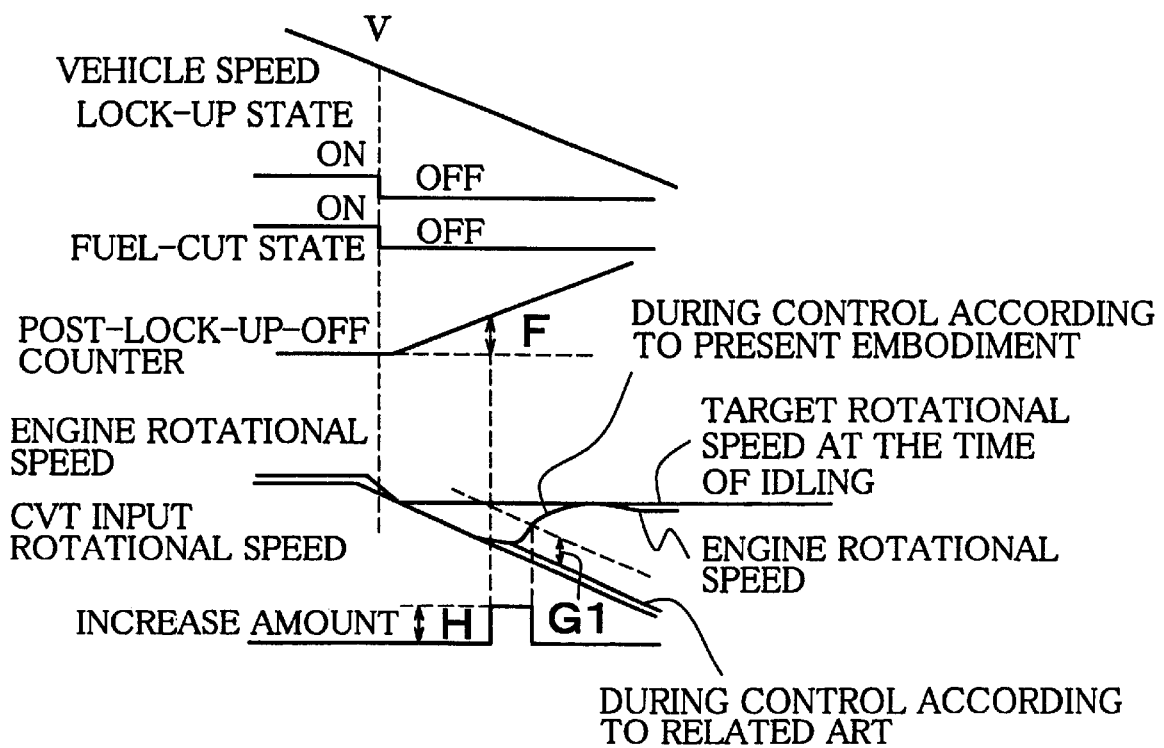
FIG. 17 is a timing chart of engine output increasing control of the fourth embodiment.

FIG. 16 is a flowchart showing a processing procedure of the ECU 32 in the fourth embodiment, and FIG. 17 is a timing chart at the time of the control. If the vehicle has decelerated to a predetermined speed V (e.g., 15 km/h), the ECU 32 terminates the fuel-cut control performed up to that point. That is, as shown in FIG. 17, the ECU 32 issues a command to terminate a locked-up state by turning the lock-up-ON flag OFF and issues a command to make restoration of control out of the fuel-cut operation by turning the fuel-cut-ON flag OFF (resumption of fuel injection for the engine 10). The ECU 32 starts a post-lock-up-OFF counter (not shown) simultaneously with operation of the respective flags.

In order to determine whether or not the vehicle is in a state of deceleration, the ECU 32 detects whether or not an idling switch (which is turned ON with the accelerator pedal not being depressed) has been turned ON. Also, the ECU 32 determines whether or not a predetermined time has elapsed after restoration of the fuel-cut operation, namely, whether or not the post-lock-up-OFF counter has reached a predetermined value F (S400). For example, the predetermined value F, which is within a permissible range of a delay of disengagement of the lock-up clutch 18, assumes a value of 100 ms. Although the predetermined value F may be constant, it is changed preferably according to a deceleration of the vehicle. That is, the more abruptly the vehicle decelerates (the more abruptly the engine rotational speed decreases), the smaller the predetermined value F is made.

In the case where the predetermined value F has not been counted up and a predetermined time has not elapsed after restoration of the fuel-cut operation in step S400, even if disengagement of the lock-up clutch 18 has not been completed, it is determined that the rotational speed of the engine 10 has not decreased to such an extent as to cause engine stall. The ECU 32 injects fuel of an amount necessary for maintenance of normal idling rotation without increasing an output of the engine 10 (S401).

On the other hand, in step S402, the delay detecting portion 70 obtains a current rotational speed of the engine 10 and a rotational speed of the vehicle (an input of the CVT 16) after the lapse of the predetermined time (after the counting of the predetermined value F), and detects a difference between the rotational speeds. If the difference between the output rotational speed of the engine 10 and the input rotational speed of the CVT 14 is equal to or smaller than a predetermined value G1, namely, if the rotational speed of the engine 10 follows the rotational speed of the CVT 16 and there is almost no difference between the rotational speeds even after the predetermined time (the predetermined value F), the disengaging operation of the lock-up clutch 18 is retarded by more than the permissible time (the predetermined value F) and the rotational speed of the engine 10 decreases. At this moment, it is determined that the engine may stall. Thus, the output of the engine 10 (the fuel injection amount) is increased by a predetermined amount H (S403). As shown in the timing chart in FIG. 17, by increasing an amount of fuel supplied to the engine 10 by the predetermined amount H, the torque of the engine 10 increases and the lock-up clutch 18 starts slipping. Then, the rotational speed of the engine 10 increases toward a target rotational speed at the time of idling, so that idling rotation of the engine 10 is maintained without causing engine stall. At this moment, it is because an actuator for the lock-up clutch operates in a releasing direction that the lock-up clutch 18 starts slipping.

Further, if it is determined in step S402 that the difference in rotational speed between the engine 10 and the CVT 14 is equal to or greater than the predetermined value G1, namely, if the difference in rotational speed between the engine 10 and the CVT 14 (the drive wheel) is enlarged in the course of deceleration of the vehicle without imposing an excessive load of the CVT 14 (the drive wheel) on the engine 10, it can be determined that the disengaging operation of the lock-up clutch 18 has been completed. Thus, the operation proceeds to step S401 where the fuel increase amount is made equal to 0. That is, fuel of a normal amount necessary for maintenance of idling rotation is injected. For the purpose of comparison, the timing chart in FIG. 17 shows a change in engine rotational speed according to the control of the fourth embodiment and a change in engine rotational speed according to the control of the related art.

In this manner, it is possible to securely and precisely detect a delay of disengaging operation of the lock-up clutch 18 based on a difference in rotational speed between the engine 10 and the CVT 14 (the drive wheel), and to increase an output of the engine 10 at a suitable timing. Therefore, it is possible to securely prevent engine stall from occurring due to an operational delay of the lock-up clutch 18.

FIG. 16 shows an example in which the engine is designed to control an amount of fuel. However, in the case of an engine designed to control an amount of air, such as an engine having an idle speed control (ISC) actuator or an electronic throttle, the same control can be performed by adjusting an output of the engine 10 through adjustment of an opening degree of the ISC actuator.

A fifth embodiment of the present invention is characterized as follows. When the vehicle reaches a predetermined running state during deceleration of the vehicle and restoration of control out of the fuel-cut operation by the fuel-cut device is made simultaneously with disengagement of the lock-up clutch, if a delay of disengaging operation of the lock-up clutch has been detected based on a difference between a preliminarily set target rotational speed at the time of idling and an actual rotational speed of the engine, the engine output is made greater than an idling maintenance output such that the engine rotational speed approaches the target rotational speed, for the purpose of preventing a decrease in engine rotational speed.

Although the ECU 32 is basically constructed in the same manner as shown in FIG. 15, the delay detecting portion 70 is connected only to the engine control portion 71. The detecting portion 70 detects a delay of disengaging operation of the lock-up clutch 18 disposed between the engine 10 and the CVT 14, based on a comparison between a rotational speed of the engine 10 and a preliminarily set target rotational speed at the time of idling. If the delay detecting portion 70 has detected a delay of disengaging operation of the lock-up clutch 18, the engine control portion 71 functions as an output amplifier for increasing an engine output by a predetermined amount from the idling maintenance output, thus increasing the engine output by the predetermined amount.

Figure 18:
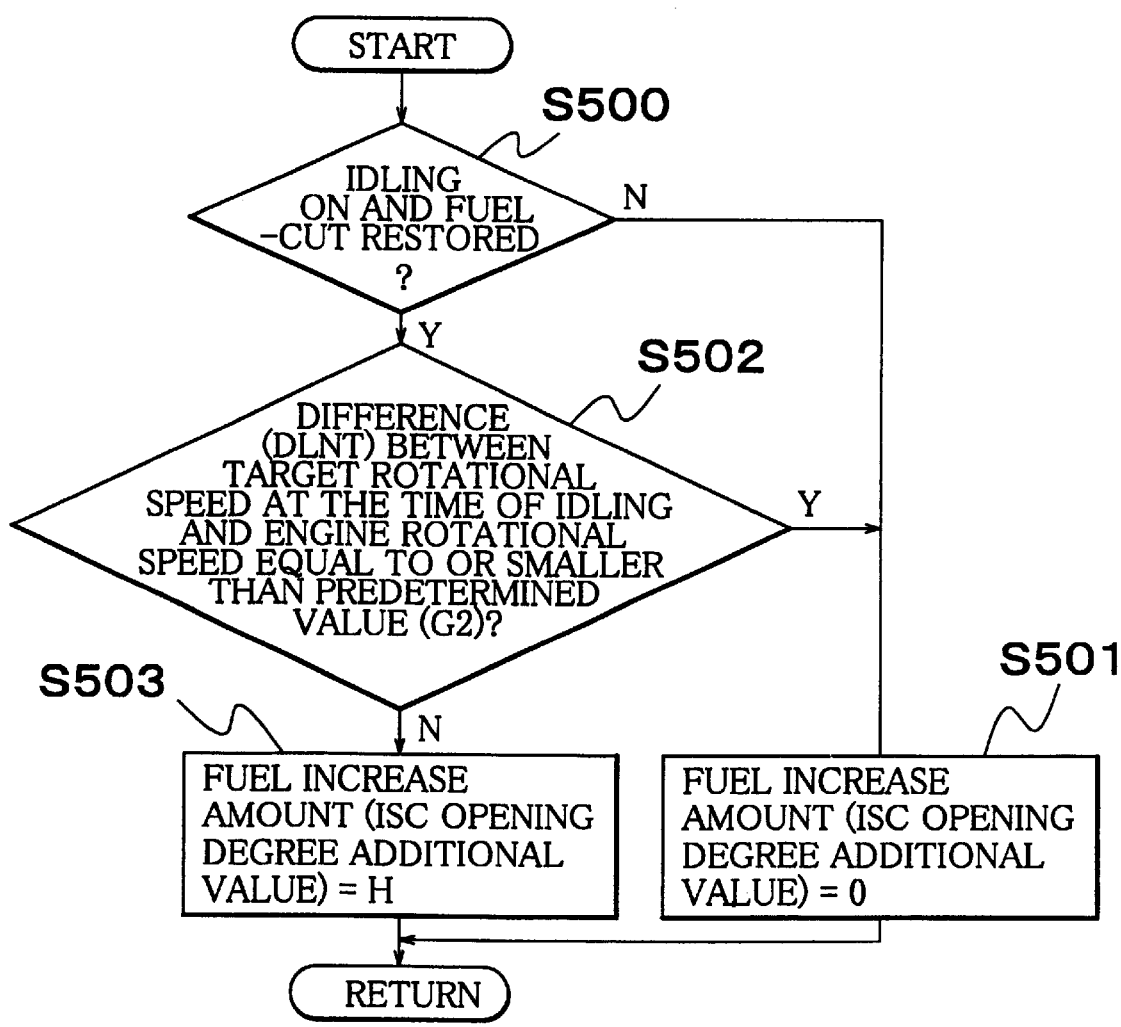
FIG. 18 is a flowchart illustrating a procedure of calculating an amount of increase in engine output in the fifth embodiment.
Figure 19:
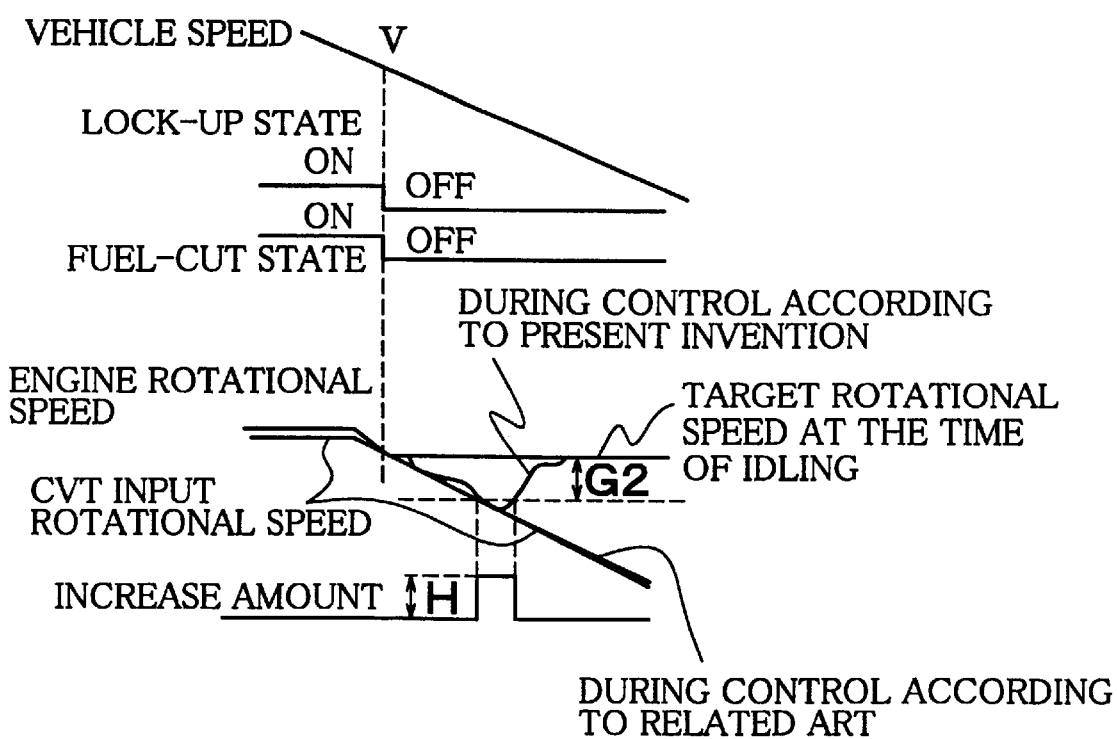
FIG. 19 is a timing chart of engine output increasing control of the fifth embodiment.

FIG. 18 is a flowchart showing a processing procedure of the ECU 32 in the fifth embodiment, and FIG. 19 is a timing chart at the time of the control. As in the fourth embodiment, if the vehicle has decelerated to a predetermined speed V (e.g., 15 km/h), the ECU 32 terminates the fuel-cut control performed up to that point. That is, as shown in FIG. 19, the ECU 32 issues a command to terminate a locked-up state by turning the lock-up-ON flag OFF and issues a command to make restoration of control out of the fuel-cut operation by turning the fuel-cut-ON flag OFF.

The ECU 32 determines whether or not the idling switch has been turned ON and the restoration out of the fuel-cut control state has arisen (S500). That is, the ECU 32 determines whether or not the engine 10 is experiencing a fuel cut and needs to maintain idling rotation. If the idling switch has not been turned ON or the restoration state has not arisen, the ECU 32 determines that there is still some room for the engine rotational speed to fall or that there is a demand for acceleration through depression of the accelerator pedal. Thus, the ECU 32 performs output control of the engine 10 according to a control amount at the time of normal idling or a depression amount of the accelerator pedal, without increasing an output of the engine 10 (the fuel increase amount=0 or the ISC opening degree additional value=0) (S501).

On the other hand, if the ECU 32 determines in step S500 that the idling switch has been turned ON and the fuel-cut restoration state has arisen, the ECU 32 then determines, through the engine control portion 71, whether or not the difference between the preliminarily set target rotational speed at the time of idling and a current rotational speed of the engine is within a permissible range of a predetermined value G2 with respect to the target rotational speed. For example, the ECU 32 determines whether or not the difference is equal to or smaller than the target rotational speed–100 rpm (S502). If the difference between the output rotational speed of the engine 10 and the target rotational speed at the time of idling is equal to or smaller than the predetermined value G2, namely, if the actual rotational speed of the engine 10 is within the permissible range with respect to the target rotational speed with the idling switch being turned ON and the fuel-cut operation being restored, the ECU 32 makes a determination as follows. That is, the ECU 32 determines that the rotational speed of the engine 10 has not decreased to such an extent as to cause engine stall despite incomplete disengagement of the lock-up clutch 18 or that the normal output control of the engine 10 can maintain rotation thereof without imposing an excessive load (a load merely based on connection through fluid in the torque converter) of the CVT 14 (the drive wheel) on the engine upon disengagement of the lock-up clutch 18 being completed. As a result, the operation proceeds to step S501, where the engine control portion 71 of the ECU 32 injects fuel of an amount necessary for maintenance of normal idling rotation without increasing an output of the engine 10 (the fuel increase amount=0 or the ISC opening degree additional value=0).

On the other hand, if the difference between the output rotational speed of the engine 10 and the set target rotational speed at the time of idling is greater than the predetermined value G2 in step S502, the rotational speed of the engine 10 decreases in response to a decrease in rotational speed (deceleration) of the drive wheel (the CVT 16) due to a delay of disengaging operation of the lock-up clutch 18. At this moment, the ECU 32 determines that there is a possibility of engine stall, and increases an output of the engine 10 (a fuel increase amount and an ISC opening degree additional value) by a predetermined amount H (S503). As shown in the timing chart in FIG. 18, by increasing an amount of fuel supplied to the engine 10 by the predetermined amount H, the torque of the engine 10 increases and the lock-up clutch 18 starts slipping, so that the rotational speed of the engine 10 reaches the permissible range of the target rotational speed at the time of idling. As a result, idling rotation can be maintained without causing engine stall. For the purpose of comparison, the timing chart in FIG. 19 shows a change in engine rotational speed according to the control of the fifth embodiment and a change in engine rotational speed according to the control of the related art.

In this manner, it is possible to securely and precisely detect a delay of disengaging operation of the lock-up clutch 18 based on a difference between a rotational speed of the engine 10 and a target rotational speed at the time of idling, and to increase an output of the engine 10 at a suitable timing. Therefore, it is possible to securely prevent engine stall from occurring due to an operational delay of the lock-up clutch 18.

In the examples of the aforementioned fourth and fifth embodiments, if a delay of disengaging operation of the lock-up clutch 18 has been detected, the output of the engine 10 to be increased (the fuel increase amount and the ISC opening degree additional value) is the predetermined value H (constant). However, according to a sixth embodiment of the present invention, the amount of increase in engine output is changed in accordance with a difference between a target rotational speed at the time of idling and an actual rotational speed of the engine 10.

Figure 20:
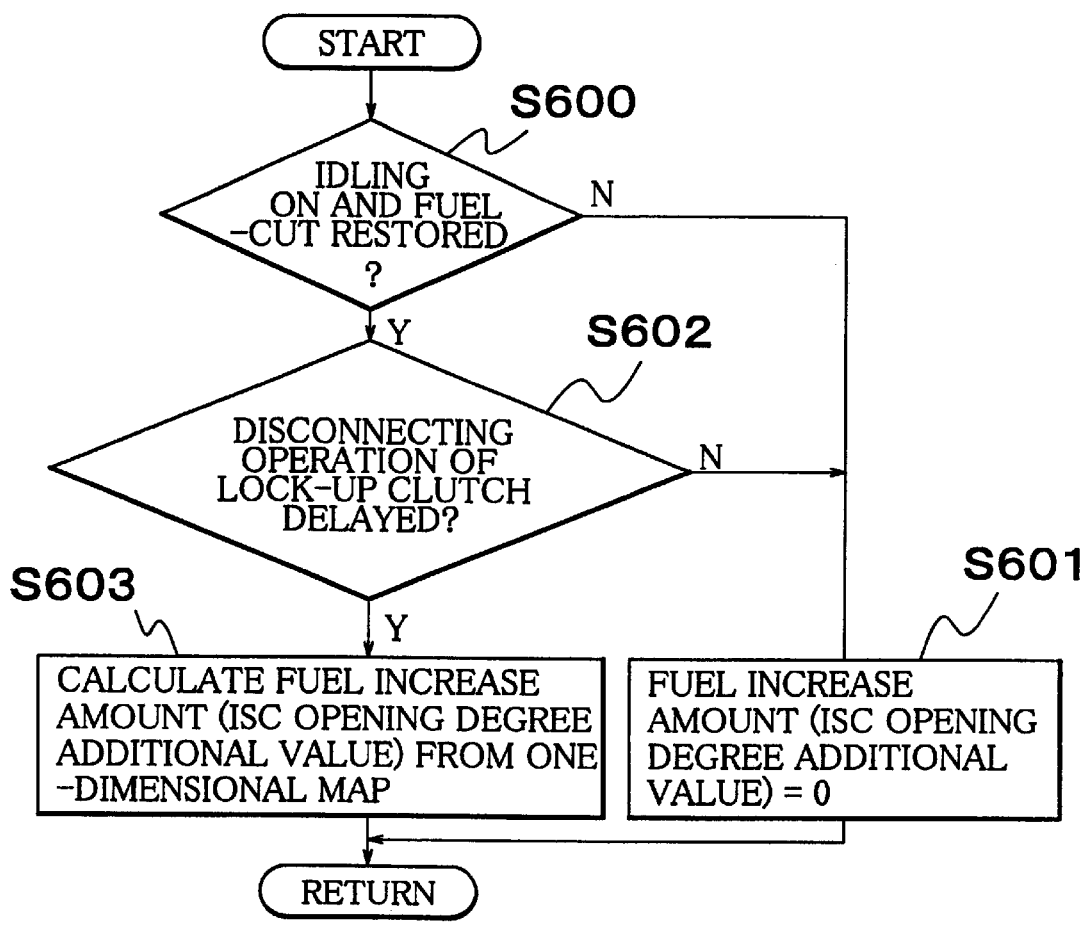
FIG. 20 is a flowchart illustrating a procedure of determining an amount of increase in engine output in the sixth embodiment.
Figure 21:
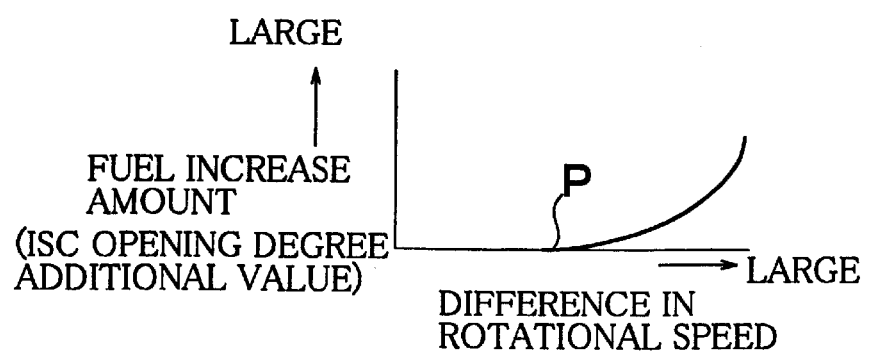
FIG. 21 is a one-dimensional map for determining an amount of increase in engine output in the sixth embodiment.
Figure 22:
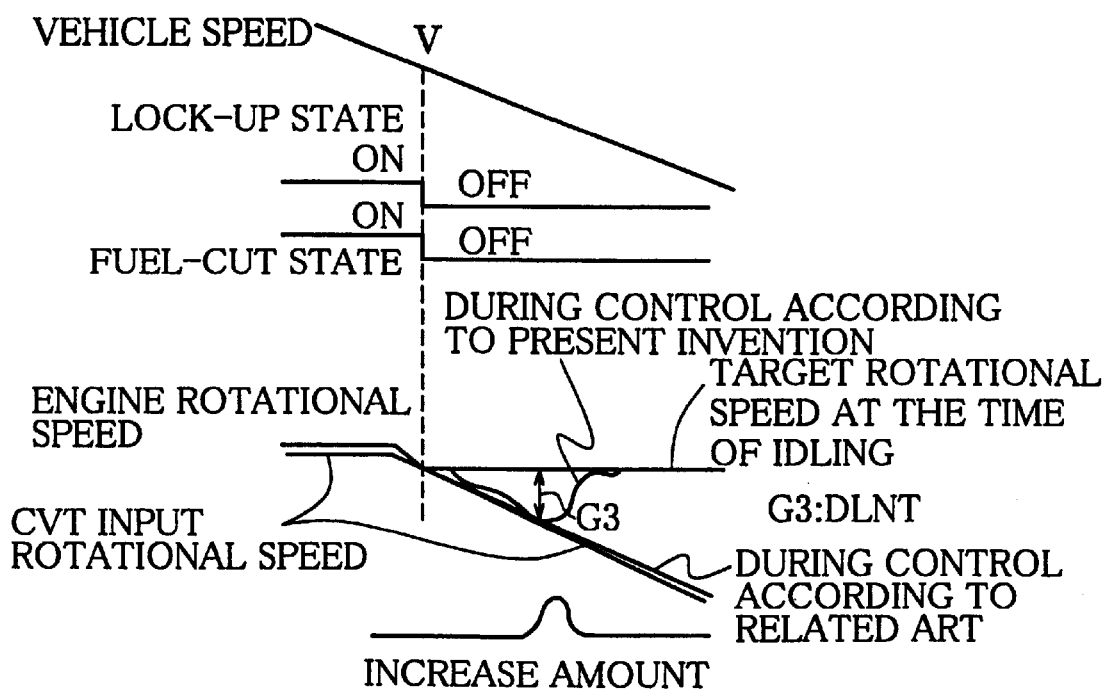
FIG. 22 is a timing chart of engine output increasing control of the sixth embodiment.

FIG. 20 is a flowchart showing a processing procedure of the ECU 32 in the sixth embodiment, and FIG. 21 is a map showing a one-dimensional map showing a relationship between a difference in rotational speed and an output increase amount (a fuel increase amount and an ISC opening degree additional value). FIG. 22 is a timing chart at the time of the control. As is the case with the aforementioned fourth and fifth embodiments, if the vehicle has decelerated to a predetermined speed V (e.g., 15 km/h), the ECU 32 terminates the fuel-cut control performed up to that point. That is, as shown in the timing chart in FIG. 22, the ECU 32 issues a command to terminate a locked-up state by turning the lock-up-ON flag OFF and issues a command to make restoration of control out of the fuel-cut operation by turning the fuel-cut-ON flag OFF.

The ECU 32 determines whether or not the idling switch has been turned ON and the restoration state out of the fuel-cut has arisen (S600). That is, the ECU 32 determines whether or not the engine 10 is experiencing a fuel cut and needs to maintain idling rotation. If the idling switch has not been turned ON or the fuel-cut restoration state has not arisen in (S600), the ECU 32 determines that there is still some room for the engine rotational speed to fall or that there is a demand for acceleration through depression of the accelerator pedal. Thus, the ECU 32 performs output control of the engine 10 according to a control amount at the time of normal idling or a depression amount of the accelerator pedal, without increasing an output of the engine 10 (the fuel increase amount=0 or the ISC opening degree additional value=0) (S601).

On the other hand, if the ECU 32 determines in step S600 that the idling switch has been turned ON and the fuel-cut restoration state has arisen, the delay detecting portion 70 detects whether or not there is a possibility of a delay of disengaging operation of the lock-up clutch according to the method described in the aforementioned fourth and fifth embodiments (S602). If there is no possibility of a delay of disengaging operation leading to engine stall, the operation proceeds to step S601, where the ECU 32 performs normal control of the engine 10. On the contrary, if there is a possibility of a delay of disengaging operation leading to engine stall, the ECU 32 calculates a difference G3 between a preliminarily set target rotational speed at the time of idling and a current rotational speed of the engine 10, selects an output increase amount (a fuel increase amount and an ISC opening degree additional value) of the engine 10 from a preliminarily stored one-dimensional map as shown in FIG. 21, and then increases an output of the engine 10 (S603).

That is, as shown in the timing chart in FIG. 22, by increasing an amount of fuel supplied to the engine 10 in accordance with the difference G3 in rotational speed, the torque of the engine 10 increases and the lock-up clutch 18 starts slipping, so that the rotational speed of the engine 10 reaches the permissible range of the target rotational speed at the time of idling. As a result, idling rotation can be maintained without causing engine stall. In this case, as shown in FIG. 21, the greater the difference between the rotational speed at the time of idling and the actual rotational speed of the engine 10, the more the output increase amount (the fuel increase amount and the ISC opening degree additional value) increases. That is, the engine output to be increased can be adjusted according to an amount of decrease in engine rotational speed (an amount of delay of disengaging operation of the lock-up clutch).

In this manner, if a delay of disengaging operation of the lock-up clutch 18 has been detected, the output of the engine 10 can be increased at a suitable timing and by a suitable amount. Therefore, it is possible to securely prevent the engine from [going into a] stalling due to the delay of operation of the lock-up clutch 18, and to inhibit fuel from being consumed wastefully. Further, the output of the engine 10 is not increased excessively. Therefore, in a vehicle equipped with a meter for indicating engine rotational speed, when engine noise is generated or the acceleration in the longitudinal direction of the vehicle changes due to an abrupt increase in torque or engine rotational speed, the value indicated by the meter does not change abruptly.

Thus, it is possible to prevent the driver from feeling a sense of incongruity. For the purpose of comparison, the timing chart in FIG. 22 shows a change in engine rotational speed according to the control of the sixth embodiment and a change in engine rotational speed according to the control of the related art.

In the flowchart shown in FIG. 20, it is determined in step S602 whether or not there is a delay of disengaging operation of the lock-up clutch. However, calculation of the difference G3 in rotational speed itself, which corresponds to calculation of the difference G2 between the target rotational speed at the time of idling and the rotational speed of the engine 10 as in the fifth embodiment, leads to detection of a delay of disengaging operation of the lock-up clutch. Hence, by using a one-dimensional map wherein the fuel increase amount is "zero" when the difference in rotational speed is low (lower than the point P) as shown in FIG. 21, it becomes possible to dispense with the determination of the delay of disengaging operation of the lock-up clutch 18 as in step S602. Consequently, the overall processing can be simplified. In this case, it is determined based on the point P in FIG. 21 whether or not there is actually a delay of disengaging operation of the lock-up clutch 18.

While the present invention has been described with reference to what are presently considered to be preferred embodiments thereof, it is to be understood that the present invention is not limited to the disclosed embodiments or constructions. On the contrary, the present invention is intended to cover various modifications and equivalent arrangements. In addition, while the various elements of the disclosed invention are shown in various combinations and configurations, which are exemplary, other combinations and configurations, including more, less or only a single embodiment, are also within the spirit and scope of the present invention.

What is claimed is:

1. A fuel-cut control device for a vehicle having a drive wheel, an engine and a torque converter having a lock-up clutch which is connected to mechanically connect the engine and the drive wheel upon engagement of the lock-up clutch, the fuel-cut control device comprising:

a fuel-cut device constructed to perform fuel-cut control to the engine until the vehicle reaches a predetermined running state during deceleration of the vehicle with the lock-up clutch being connected;

an abrupt vehicle deceleration detector; and a forcible restorer constructed to suspend the fuel-cut control and make forcible restoration of control out of the fuel-cut control when the abrupt vehicle deceleration detector detects an abrupt vehicle deceleration, wherein the abrupt vehicle deceleration detector detects an actuating signal of a brake assist system.

2. The vehicle according to claim 1, further comprising:

an engine output controller, wherein said forcible restorer is constructed to control the engine output controller to temporarily increase an engine output by a predetermined amount with respect to an idling maintenance output of the engine at a time of the forcible restoration.

3. The vehicle according to claim 2, wherein:

the engine output controller determines an amount and a rate of change in engine output at the time of forcible restoration based on the detected vehicle deceleration.

4. The vehicle according to claim 1, further comprising:

an engine output controller;

wherein said forcible restorer is constructed to control the engine output controller at a predetermined time prior to disconnection of the lock-up clutch after attainment of a predetermined running state by the vehicle to gradually make restoration of control out of the fuel-cut control such that the engine output temporarily becomes greater than an idling maintenance output.

5. The vehicle according to claim 4, wherein:

the engine output controller determines an amount and a rate of change in engine output at the time of forcible restoration based on the detected vehicle deceleration.

6. The vehicle according to claim 1, further comprising:

a lock-up clutch disconnection delay detector; and an output amplifier constructed to increase an engine output from an idling maintenance output when the lock-up clutch disconnection delay detector detects a delay of disconnection of the lock-up clutch when the forcible restoration occurs simultaneously with the disconnection of the lock-up clutch.

7. The vehicle according to claim 6, wherein:

the lock-up clutch disconnection delay detector detects a delay of disconnecting operation of the lock-up clutch based on a difference between an engine rotational speed and a rotational speed of the drive wheel.

8. The vehicle according to claim 7, wherein:

the output amplifier calculates an increase amount of the engine output based on a difference between a predetermined idling rotational speed and an actual engine rotational speed.

9. The vehicle according to claim 6, wherein:

the lock-up clutch disconnection delay detector detects a delay of disconnecting operation of the lock-up clutch if a decrease in engine rotational speed with respect to a predetermined idling rotational speed is equal to or greater than a predetermined value.

10. The vehicle according to claim 9, wherein:

the output amplifier calculates an increase amount of the engine output based on a difference between a predetermined idling rotational speed and an actual engine rotational speed.

11. The vehicle according to claim 6, wherein:

the output amplifier calculates an increase amount of the engine output based on a difference between a predetermined idling rotational speed and an actual engine rotational speed.

* * * * *